(12) United States Patent
Hirai

(10) Patent No.: US 11,301,187 B2
(45) Date of Patent: Apr. 12, 2022

(54) COMMUNICATION APPARATUS CAPABLE OF OPERATING IN CONNECTION SETTING STATE AND PERFORMING INITIAL SETTING

(71) Applicant: CANON KABUSHIKI KAISHA, Tokyo (JP)

(72) Inventor: Yoshiyuki Hirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/187,551

(22) Filed: Feb. 26, 2021

(65) Prior Publication Data

US 2021/0271433 A1 Sep. 2, 2021

(30) Foreign Application Priority Data

Mar. 2, 2020 (JP) .............................. JP2020-035176

(51) Int. Cl.
*G06F 3/12* (2006.01)
*H04N 1/00* (2006.01)

(52) U.S. Cl.
CPC .......... *G06F 3/1236* (2013.01); *G06F 3/1209* (2013.01); *G06F 3/1221* (2013.01); *H04N 1/00891* (2013.01); *G06F 3/1292* (2013.01)

(58) Field of Classification Search
CPC .... G06F 3/1236; G06F 3/1209; G06F 3/1221; H04N 1/00891

USPC ........................................................ 358/1.13
See application file for complete search history.

(56) References Cited

U.S. PATENT DOCUMENTS

| | | | |
|---|---|---|---|
| 2013/0258381 A1* | 10/2013 | Sato ....................... | H04N 1/001 358/1.13 |
| 2016/0224287 A1* | 8/2016 | Watanabe ............. | G06F 3/1236 |
| 2017/0039012 A1* | 2/2017 | Minegishi ............. | H04L 63/083 |
| 2019/0235609 A1* | 8/2019 | Matsumoto ......... | G06F 13/1668 |
| 2019/0239259 A1* | 8/2019 | Kunimatsu ........... | G06F 3/1221 |

FOREIGN PATENT DOCUMENTS

JP 2015023440 A 2/2015

* cited by examiner

*Primary Examiner* — Allen H Nguyen
(74) *Attorney, Agent, or Firm* — Canon U.S.A., Inc. I.P. Division

(57) ABSTRACT

In a case where a connection between a communication apparatus operating in a connection setting state and a terminal apparatus has been established during a period in which an initial setting of the communication apparatus is being performed, the communication apparatus displays a predetermined notification screen on a display unit after the initial setting is completed, and, in a case where a connection between the communication apparatus operating in the connection setting state and the terminal apparatus has not been established during a period in which the initial setting is being performed, the communication apparatus does not display the predetermined notification screen on the display unit after the initial setting is completed.

20 Claims, 10 Drawing Sheets

FIG.8

Setup of the printer has ended.
This has made it ready to copy. ~801

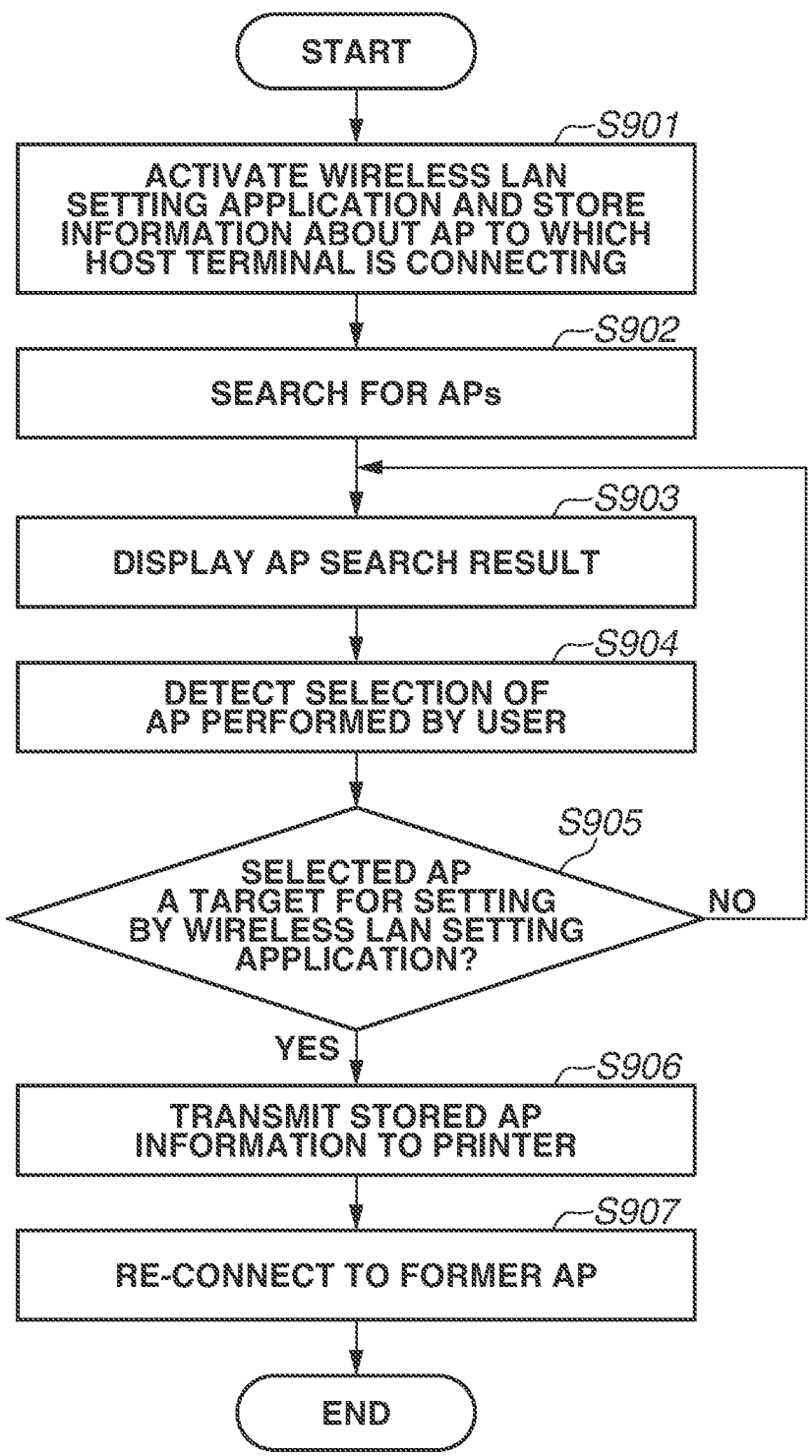

Connection setting of the printer has been performed by a PC or smartphone.
If you have not intended this,
please reset connection of the printer via the setup menu.

OK

Please perform connection setting.
You can scan the following QR code to display a method for connection setting.

OK

COMMUNICATION APPARATUS CAPABLE OF OPERATING IN CONNECTION SETTING STATE AND PERFORMING INITIAL SETTING

BACKGROUND

Field

Aspects of the present disclosure generally relate to a communication apparatus.

Description of the Related Art

There are known communication apparatuses, such as printers, each of which communicates with a terminal apparatus such as a personal computer (PC) or a smartphone. Such a communication apparatus can be configured to perform, for example, connection setting processing for performing communication with a terminal apparatus by a predetermined communication method such as Wi-Fi®. Moreover, at the time that connection setting processing occurs, the communication apparatus can operate in a connection setting state (a connection setting mode), which is a state for performing the connection setting processing.

Japanese Patent Application Laid-Open No. 2015-023440 describes a communication apparatus which operates in a software access point (AP) mode receiving an apparatus information setting command and setting an operation mode based on the received command.

Furthermore, with the popularization of apparatuses which perform connection setting processing, improving mechanisms for performing connection setting processing more appropriately is desirable.

SUMMARY

Various embodiments of the present disclosure provide improved mechanisms for performing connection setting processing.

According to various embodiments of the present disclosure, a communication apparatus is provided which includes a first control unit configured to, in a case where an initial setting of the communication apparatus is not yet completed and, in a state in which the communication apparatus is powered off, and a power-on operation for powering on the communication apparatus has been performed, cause the communication apparatus to start operating in a connection setting state for performing, with a terminal apparatus, communication of connection information used for establishing a connection between the communication apparatus and a different apparatus that is different from the communication apparatus. The communication apparatus also includes a second control unit configured to, in a case where the communication apparatus has performed communication of the connection information with the terminal apparatus which is currently connecting to the communication apparatus operating in the connection setting state, establish a connection between the communication apparatus and the different apparatus. The communication apparatus also includes a third control unit configured to, in a case where an initial setting of the communication apparatus is not yet completed and, in a state in which the communication apparatus is powered off, and the power-on operation has been performed, start the initial setting. In addition, the communication apparatus includes a fourth control unit configured to, in a case where a connection between the communication apparatus operating in the connection setting state and the terminal apparatus has been established during a period in which the initial setting is being performed, display a predetermined notification screen on a display unit after the initial setting is completed, and, in a case where a connection between the communication apparatus operating in the connection setting state and the terminal apparatus has not been established during a period in which the initial setting is being performed, not display the predetermined notification screen on the display unit after the initial setting is completed.

Further features of the present disclosure will become apparent from the following description of exemplary embodiments with reference to the attached drawings.

BRIEF DESCRIPTION OF THE DRAWINGS

FIG. 8 is a diagram illustrating an example of a screen which the communication apparatus displays according to one embodiment.

FIG. 9 is a flowchart illustrating connection setting processing which a terminal apparatus performs according to one embodiment.

DESCRIPTION OF THE EMBODIMENTS

Various exemplary embodiments, features, and aspects of the invention will be described in detail below with reference to the drawings. However, it should be understood that other embodiments obtained by performing alteration or modification as appropriate on exemplary embodiments described below, based on the ordinary knowledge of a person skilled in the art without departing from the gist of the invention, also fall within the scope of the invention.

A communication apparatus according to an exemplary embodiment of the present disclosure is described. While, in the present exemplary embodiment, a printer (printing apparatus) is taken as an example of the communication apparatus, the present exemplary embodiment is not limited to a printer and can be applied to various apparatuses as long as those are apparatuses capable of performing connection to a terminal apparatus in the manner described below. For example, with respect to printers, the present exemplary embodiment can be applied to, for example, an inkjet printer, a full-color laser beam printer, or a monochrome printer, for example. Moreover, the present exemplary embodiment can be applied to not only printers but also to, for example, a copying machine, a facsimile apparatus, a portable terminal, a smartphone, a personal computer (PC), a tablet terminal, a personal digital assistant (PDA), a digital camera, or a smart speaker, for example. Furthermore, the smart speaker can be an apparatus which acts to issue an instruction for processing to a device present on the same network according to a voice uttered by the user and to notify the user of information acquired via the network in response to a voice uttered by the user. Additionally, the present exemplary embodiment can also be applied to a multifunction peripheral equipped with a copying function, a facsimile function, or a printing function, for example. Moreover, while a PC is taken as an example of the terminal apparatus, the present exemplary embodiment is not limited to this configuration and can be applied to various embodiments where the terminal apparatus consists of other terminals such as a portable terminal, a smartphone, a tablet terminal, a PDA, or a digital camera, for example.

Figure 1:
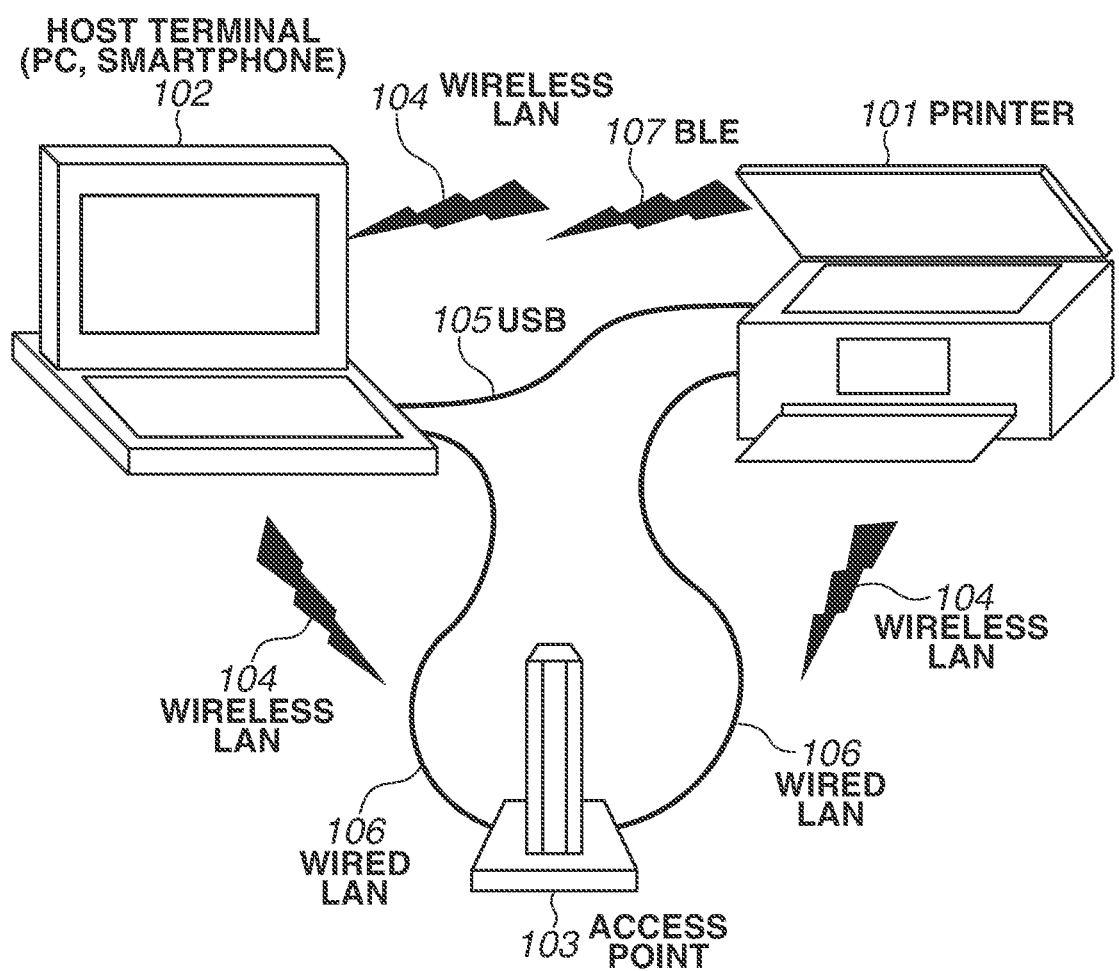
FIG. 1 is an outline diagram of a communication system according to one embodiment.

FIG. 1 is an outline diagram of a communication system according to the present exemplary embodiment.

The communication system in the present exemplary embodiment includes a printer 101, a host terminal 102, and an access point (hereinafter referred to as an "AP") 103. The printer 101 is a communication apparatus in the present exemplary embodiment. The host terminal 102 is a terminal apparatus in the present exemplary embodiment. The AP 103 is an external access point, which is present outside the terminal apparatus and the communication apparatus, and is, for example, wireless local area network (LAN) router. The terminal apparatus performs communication via the external access point, thus being able to perform communication with a communication apparatus which is connecting to the external access point or the Internet.

In the present exemplary embodiment, the printer 101 is able to perform wireless connection to the host terminal 102 by a direct connection method, in which the printer 101 directly connects to the host terminal 102 by peer-to-peer connection without via the AP 103. Moreover, the printer 101 is able to perform wireless connection to the host terminal 102 by an infrastructure connection method, in which the printer 101 connects to the host terminal 102 via the AP 103. Furthermore, the communication standard for use in each connection method is not particularly limited. A wireless LAN 104 compliant with the communication standard in the IEEE 802.11 series can be used. In addition, for example, a Universal Serial Bus (USB) 105, a wired LAN 106, a Bluetooth® Low Energy (BLE) 107 can also be used.

Figure 2:
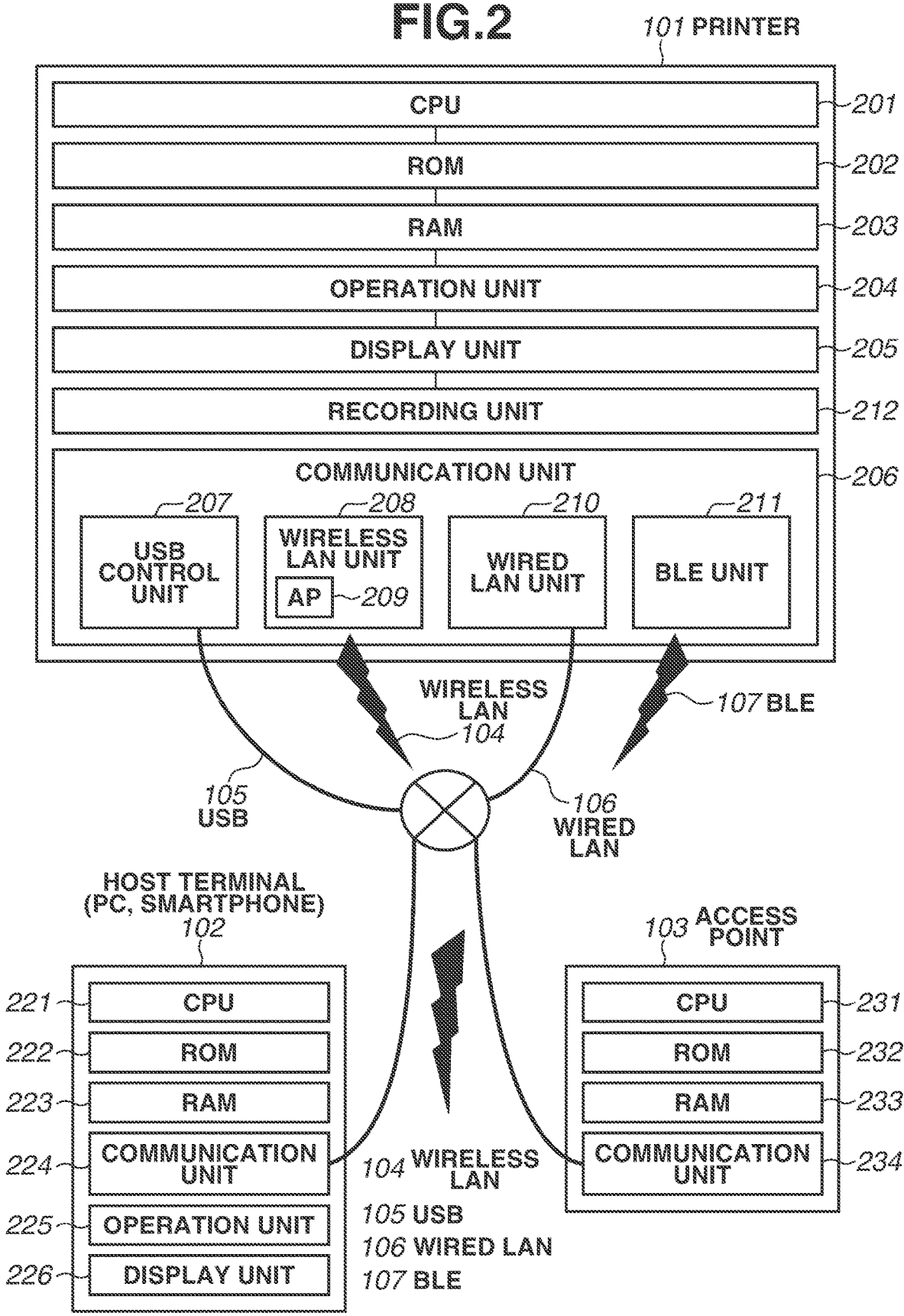
FIG. 2 is a hardware configuration diagram of apparatuses included in the communication system according to one embodiment.

FIG. 2 is a hardware configuration diagram of the printer 101, the host terminal 102, and the AP 103.

The printer 101 includes a central processing unit (CPU) 201, a read-only memory (ROM) 202, a random access memory (RAM) 203, an operation unit 204, a display unit 205, a communication unit 206, and a recording unit 212. A computer of the printer 101 is configured with, for example, the CPU 201, the ROM 202, and the RAM 203.

The CPU 201, which is a system control unit, controls the entire printer 101.

The ROM 202 stores fixed data such as control programs which the CPU 201 executes, data tables, and a built-in operating system (OS) program. In the present exemplary embodiment, each control program stored in the ROM 202 is used for the CPU 201 to perform, for example, software execution control, such as scheduling, task switching, and interrupt processing, under the control of the built-in OS program stored in the ROM 202.

The RAM 203 is configured with, for example, a static random access memory (SRAM), which requires a backup power source, and retains data with use of a primary battery for backup. The RAM 203 stores, for example, program control variables. Moreover, the RAM 203 is also provided with a memory area used for storing, for example, setting values such as wireless LAN settings registered by the user, management data about the printer 101, and information indicating whether the printer 101 is at the time of setting of the printer 101 for the first time after being powered on (hereinafter referred to as an "initial setting time"). Furthermore, in other words, the initial setting time is a time at which the printer 101 is in an initial setting state in which the printer 101 has never performed initial setting time cleaning processing described below.

The operation unit 204 is a configuration for receiving an operation from the user, and is configured with, for example, keys and buttons, such as a numerical entry button, a mode setting button, a select button, an undo button, a cancel button (stop button), and a home button. Various keys and buttons included in the operation unit 204 can be physical keys and physical buttons or can be software keys and software buttons, which are displayed by software. Furthermore, the cancel button is a button used to cancel (stop) processing which the printer 101 is performing. For example, when the cancel button has been pressed in a state in which the printer 101 is performing printing, such printing is canceled. Moreover, the display unit 205 is a configuration used to present information to the user, and is configured with, for example, a light-emitting diode (LED) or a liquid crystal display (LCD). In the present exemplary embodiment, a display unit used for presenting information is assumed to be configured with a segment display composed of an LED, and keys used for receiving an operation from the user are assumed to be configured with physical buttons. The printer 101 is able to be operated by the user via the operation unit 204 to perform start-up of various functions and various settings for the printer 101. Furthermore, the display unit 205 can be configured to include no display unit composed of an LED or LCD. Moreover, the display unit 205 can be configured to include a display unit composed of an LED but include no display unit composed of an LCD. In that case, for example, the printer 101 performs various notifications by, for example, blinking the LED. Moreover, an operation display unit configured with, for example, a touch panel can also be used as a configuration in which the operation unit 204 and the display unit 205 are integrated with each other.

In the present exemplary embodiment, the display unit 205 displays various screens. Specifically, for example, the display unit 205 displays a home screen and various notification screens. The home screen is a screen which is displayed on the display unit 205 in response to the printer 101 having performed start-up in a state in which the printer 101 is not at the initial setting time (normal start-up). Moreover, the home screen is a screen which is displayed on the display unit 205 in response to a home button included in the operation unit 204 having been pressed. Moreover, the home screen is a screen which is displayed after initial setting processing described below is completed. The user is allowed to select various icons such as keys and buttons included in the home screen to instruct the printer 101 to perform various processing operations. For example, the user is allowed to instruct the printer 101 to perform printing, copying, and scanning. Moreover, the user is allowed to instruct the printer 101 to perform setting processing for causing the printer 101 to use an interface selected by the user.

The recording unit 212, which is composed of, for example, a laser beam printer or an inkjet printer, prints an image by applying a recording agent to a recording medium based on color image data or monochrome image data generated by a recording control unit (not illustrated). Furthermore, the recording medium to be used is not limited to paper, and can be various mediums such as a film. Moreover, the size or shape of the recording medium to be used is not particularly limited. Moreover, the recording agent to be used is, for example, ink or toner.

Furthermore, the printer 101 is assumed to be an inkjet printer, and the recording unit 212 is assumed to include a recording head used for ejecting ink onto a recording medium and an ink tank storing ink to be supplied to the recording head. Moreover, the recording unit 212 is assumed to have a configuration in which the recording head and the ink tank are formed integrally with each other, and the recording unit 212 is assumed to include a carriage to and from which the ink cartridge is attached and detached and which performs scanning on the surface of the recording medium during printing. The printer 101 is able to detect, by a cartridge sensor (detection unit) (not illustrated), whether an ink cartridge is currently attached to the carriage. Furthermore, a configuration in which the recording head and the ink tank are formed separately from each other and the recording head and the ink tank are attached to the respective different attaching portions inside the recording unit 212 can be employed.

Furthermore, the printer 101 is provided with a cover which covers an opening portion of the printer 101. The cover is able to turn or move between an open position for opening the opening portion of the printer 101 and a closed position for covering the opening portion of the printer 101. When the cover is situated at the open position, the user is allowed to visually recognize the inside of the printer 101 via the opening portion of the printer 101 and attach an ink cartridge to the recording unit 212. The printer 101 includes a cover sensor (not illustrated) used to detect whether the cover is situated at the closed position. Then, in response to the cover sensor detecting that the cover has moved from the closed position, the printer 101 causes the carriage to move from a standby position to the position of the opening portion (a cartridge attaching position). Then, the user attaches an ink cartridge to the carriage. After that, in response to the cover sensor detecting that the cover has returned to the closed position, the printer 101 causes the cartridge to move from the cartridge attaching position to the standby position.

The communication unit 206 is a configuration used to perform communication with another apparatus.

A USB control unit 207 is a control unit which performs connection control for Universal Serial Bus (USB) interface used to perform connection by a protocol defined in a USB connection standard. The USB connection standard is a standard which enables performing bidirectional data connection at high speed, and using the USB connection standard enables connecting a plurality of hubs or functions (slaves) to one host (master). Specifically, the USB control unit 207 converts data obtained from a USB function control task which the CPU 201 executes into a packet and then transmits the packet to the host terminal 102 by USB packet transmission. Additionally, the USB control unit 207 converts a USB packet received from an external PC into data and then transmits the data to the CPU 201.

A wireless LAN unit 208 performs connection and communication with a network (network capable of performing connection compliant with the Transmission Control Protocol/Internet Protocol (TCP/IP)) terminal by wireless connection. The wireless LAN unit 208 is a unit configured to perform wireless connection with the AP 103 and the host terminal 102. The wireless LAN unit 208 is able to perform data (packet) connection in a wireless LAN (hereinafter referred to as "WLAN") system. In the present exemplary embodiment, the wireless LAN unit 208 performs communication by performing a communication (Wi-Fi® communication) compliant with the IEEE 802.11 series. Thus, in the present exemplary embodiment, the wireless LAN is assumed to be a network using Wi-Fi communication.

A wired LAN unit 210 is a configuration which performs communication by Ethernet using a wired LAN cable.

A BLE unit 211 is able to perform connection and communication with another apparatus with use of Bluetooth Low Energy.

In response to a communication mode being set, the printer 101 operates in such a way as to be able to perform communication via the wireless LAN unit 208 by a connection configuration associated with the communication mode. Thus, in the present exemplary embodiment, the printer 101 is assumed to perform, by WLAN, a communication using a connection configuration associated with the set communication mode. Details of connection setting processing, which is processing for setting a communication mode, are described below.

The host terminal 102 includes a CPU 221, a ROM 222, a RAM 223, a communication unit 224, an operation unit 225, and a display unit 226. The respective constituent elements of the host terminal 102 are similar to the above-mentioned respective constituent elements of the printer 101, and are, therefore, omitted from description. The host terminal 102 is able to connect to the printer 101 and the AP 103 via the communication unit 224 by the communication standards of, for example, the wireless LAN 104, the USB 105, the wired LAN 106, and the BLE 107.

The AP 103 includes a CPU 231, a ROM 232, a RAM 233, and a communication unit 234. The respective constituent elements of the AP 103 are similar to the above-mentioned respective constituent elements of the printer 101, and are, therefore, omitted from description. The AP 103 is able to connect to the printer 101 and the host terminal 102 via the communication unit 234 by the communication standards of, for example, the wireless LAN 104, the USB 105, the wired LAN 106, and the BLE 107.

<Wi-Fi Communication (Direct Connection Mode)>

To establish direct connection, which is a connection using a connection configuration of the peer-to-peer (P2P) method, in communication using Wi-Fi, the printer 101 in the present exemplary embodiment operates in a direct connection mode. As mentioned above, direct connection refers to a configuration in which apparatuses directly perform wireless connection with each other without via an external apparatus such as the AP 103. The direct connection mode includes a software AP mode and a Wi-Fi direct (WFD) mode. The printer 101 operating in the direct connection mode operates as a master station in a network to which the printer 101 belongs. Furthermore, the master station in the present exemplary embodiment is an apparatus which constructs a wireless network, and is an apparatus which provides, to a slave station, parameters used for connection to a wireless network. The parameters used for connection to a wireless network are, for example, parameters concerning a wireless channel which the master station uses. Upon receiving the parameters, the slave station connects to a wireless network which the master station has constructed with use of a communication channel which the master station is using.

Furthermore, the WFD is a standard formulated by the Wi-Fi Alliance®. The WFD enables the host terminal 102 and the printer 101, which are WFD-compatible apparatuses, to directly perform wireless connection with each other without via any external AP. An apparatus which is a WFD-compatible apparatus and plays the role of an access point (AP) (master station) is referred to specifically as a "group owner". Then, a mode for performing direct connection by WFD is referred to as a "WFD mode".

Moreover, the printer 101 has a software access point (hereinafter referred to as "software AP") function which is to operate as an AP. The printer 101 enables (activates) an access point (AP) 209, which is a software AP provided inside the printer 101, and the host terminal 102 connects to the AP 209 not by WFD but by ordinary Wi-Fi. Such a connection enables the host terminal 102 and the printer 101 to perform direct wireless connection with each other without via any external AP. A mode for performing direct connection in response to a software AP provided inside the printer 101 operating by being enabled is referred to as a "software AP mode". Furthermore, when the software AP mode stops, the printer 101 disables the software AP provided inside the printer 101 and then enters into a state of being unable to perform direct connection with another apparatus using the software AP.

Since, in the direct connection mode, the printer 101 operates as a master station, the printer 101 is able to determine which of channels to use for a communication in the direct connection mode. For example, when operating in the infrastructure connection mode and the direct connection mode in parallel, the printer 101 performs control to use a communication channel which is being used for a communication in the infrastructure connection mode also for a communication in the direct connection mode. Moreover, for example, as a channel to be used for a communication in the direct connection mode, the printer 101 can select a channel for use in a connection with the AP 103 in preference to the other channels.

Moreover, connection information (a service set identifier (SSID) or a password) required for connection to the printer 101 operating in the direct connection mode can be optionally changed in response to, for example, a user operation performed on the operation unit 204 included in the printer 101.

<Wi-Fi Communication (Infrastructure Connection Mode)>

To establish a connection using a connection configuration of the infrastructure type in communication using Wi-Fi, the printer 101 in the present exemplary embodiment is assumed to operate in an infrastructure connection mode. Furthermore, in the present exemplary embodiment, infrastructure connection refers to a configuration in which an external apparatus which comprehensively controls a network, such as the AP 103, operates as a master station and apparatuses perform wireless connection with each other via the master station. The printer 101 operating in the infrastructure connection mode operates as a slave station in a network to which the printer 101 belongs.

Furthermore, to perform communication with the printer 101 via the AP 103, the host terminal 102 is required to recognize that the printer 101 belongs to a network which is formed by the AP 103 and to which the host terminal 102 belongs. Specifically, the host terminal 102 transmits a search signal onto the network to which the host terminal 102 belongs via the AP 103, and then performs communication confirmation with respect to the printer 101.

In the present exemplary embodiment, a state in which the host terminal 102 and the printer 101 are merely connecting to the same AP is deemed to be an infrastructure connection state. Thus, in the infrastructure connection state, the host terminal 102 and the printer 101 only need to be connecting to the same AP, and one apparatus does not need to recognize that the other apparatus belongs to a network to which the one apparatus itself belongs.

Furthermore, in the present exemplary embodiment, the printer 101 is able to establish direct connection and infrastructure connection in parallel. In other words, the printer 101 is able to establish Wi-Fi connection in which the printer 101 itself serves as a slave station and Wi-Fi connection in which the printer 101 itself serves as a master station in parallel. Operating in a state in which the above-mentioned two connections are established in parallel in the above-described way is referred to as a "simultaneous operation". When performing the simultaneous operation, the printer 101 makes a frequency band and a communication channel for use in infrastructure connection equal to a frequency band and a communication channel for use in direct connection. However, in the present exemplary embodiment, when using a frequency band of 5 gigahertz (GHz) for infrastructure connection, the printer 101 does not operate in the direct connection mode and thus does not perform the simultaneous operation. This is because, in a case where a frequency band of 5 GHz is used, a communication channel to be used has the possibility of being changed due to, for example, dynamic frequency selection (DFS).

<Connection Setting Processing>

In the present exemplary embodiment, the host terminal 102 performs setting (connection setting) for causing the printer 101 to operate in at least one communication mode out of the infrastructure connection mode and the direct connection mode, with use of wireless communication with the printer 101. The connection setting processing in the present exemplary embodiment is performed with use of wireless communication and is, therefore, also called "cableless setup (CLS)". Furthermore, the connection setting processing can be performed with a wired communication standard.

The printer 101 performs the connection setting processing in a state in which the printer 101 is operating in a connection setting mode (connection setting state), which is a mode for performing the connection setting processing. Details of the connection setting mode are described below.

The host terminal 102 performs connection setting processing when a predetermined program stored in the ROM 202 or an external storage device (not illustrated) is running. The predetermined program is an application program for performing setting of an AP serving as a connection destination of the printer 101 or for causing the printer 101 to print, for example, image data or document data stored in the host terminal 102, and is hereinafter referred to as a setup program. Furthermore, the setup program can include, in addition to the function of setting an AP serving as a connection destination of the printer 101 and the function of printing, another function. For example, in a case where the printer 101 includes a scan function, the setup program can include, for example, the function of causing an original set on the printer 101 to be scanned, the function of performing other settings of the printer 101, and the function of checking the status of the printer 101.

When causing the AP 103 and the printer 101 to connect to each other and causing the printer 101 to operate in the infrastructure connection mode, the host terminal 102 wirelessly transmits, to the printer 101, infrastructure setting information for causing the printer 101 to operate in the infrastructure connection mode. The infrastructure setting information includes, for example, information concerning the AP 103. Then, the information concerning the AP 103 is, for example, an SSID of the AP 103, a password used for connecting to the AP 103, or information concerning a frequency band which the AP 103 uses.

On the other hand, when causing the printer 101 to operate in the direct connection mode, the host terminal 102 wirelessly transmits, to the printer 101, direct setting information for causing the printer 101 to operate in the direct connection mode. The direct setting information includes an instruction for enabling the WFD function and causing the printer 101 to operate as a group owner or for enabling an AP provided inside the printer 101. Moreover, the host terminal 102 acquires, from the printer 101, connection information required for direct connection to the printer 101. The connection information required for direct connection to the printer 101 includes, for example, an SSID of the printer 101 or a password used for connection to the printer 101.

In the present exemplary embodiment, in the connection setting processing, to transmit infrastructure setting information or direct setting information and acquire information required for direct connection to the printer 101, direct connection for connection setting between the host terminal 102 and the printer 101 is used. Then, in the present exemplary embodiment, the direct connection for connection setting is assumed to include two connections, i.e., a connection using Wi-Fi and a connection using BLE. Thus, in the present exemplary embodiment, the host terminal 102 is assumed to be able to perform connection setting processing using Wi-Fi and connection setting processing using BLE.

Furthermore, as the direct connection for connection setting, for example, wireless communication standards other than Wi-Fi and BLE, such as Classic Bluetooth, can be used or wired communication standards such as a wired LAN and a USB can be used.

The connection setting processing using Wi-Fi is described. When operating in the connection setting mode, the printer 101 enables, inside the printer 101, a predetermined access point which is able to be enabled only when the printer 101 is operating in the connection setting mode. The predetermined access point is an access point to which the host terminal 102 is able to connect with use of connection information which a wireless LAN setting application included in the host terminal 102 has previously acquired. Furthermore, the above-mentioned connection information includes, for example, information concerning an SSID of the predetermined access point. Moreover, in a case where the predetermined access point is an access point which requests entry of a password for connection, the above-mentioned connection information includes a password required for connection to the predetermined access point. Furthermore, in the present exemplary embodiment, the predetermined access point is assumed to be an access point which does not request entry of a password for connection. Moreover, the wireless LAN setting application is an application program for setting a communication mode to the printer 101. Furthermore, the wireless LAN setting application can include another function such as the function of transmitting a print job to the printer 101 and causing the printer 101 to perform printing. The wireless LAN setting application is a program stored in a storage device (not illustrated) provided inside the host terminal 102, and is installed by the user on the host terminal 102 in advance. In the connection setting processing using Wi-Fi, the host terminal 102 uses the wireless LAN setting application to perform Wi-Fi connection to the printer 101, which has enabled the predetermined access point. Then, the host terminal 102 performs communication of infrastructure setting information or direct setting information via the thus-established Wi-Fi connection between the printer 101 and the host terminal 102, thus performing connection setting processing.

The connection setting processing using BLE is described. When operating in the connection setting mode, the printer 101 broadcasts, by BLE, predetermined advertising information including information indicating that the printer 101 is operating in the connection setting mode. Thus, when starting an operation in the connection setting mode, the printer 101 starts an operation serving as an advertiser in the BLE standard. In the connection setting processing using BLE, the host terminal 102 uses the wireless LAN setting application to perform BLE connection to the printer 101, which is broadcasting the predetermined advertising information. Then, the host terminal 102 performs communication of infrastructure setting information or direct setting information via the thus-established BLE connection between the printer 101 and the host terminal 102, thus performing connection setting processing.

Furthermore, in the present exemplary embodiment, regardless of which communication method is used to perform connection setting processing, entry of a password for establishing connection between the printer 101 and the host terminal 102 is assumed not to be performed. This is because, since a connection performed between the printer 101 and the host terminal 102 during execution of connection setting processing is a temporary one, the easiness of connection is prioritized over the highness of security.

After infrastructure connection or direct connection using Wi-Fi is established between the host terminal 102 and the printer 101 by the connection setting processing, a communication becomes able to be performed between the host terminal 102 and the printer 101 via the established connection. Specifically, for example, the host terminal 102 becomes able to transmit, to the printer 101 via the established connection, a print job for causing the printer 101 to perform printing or a scan job for causing the printer 101 to perform scanning.

<Connection Setting Mode>

As mentioned above, the printer 101 is able to operate in the connection setting mode. For example, a trigger for the printer 101 to start operating in the connection setting mode can be the user pressing a connection setting mode button or can be the printer 101 starting up (being powered on) for the first time after arrival of shipment. The connection setting mode button can be a hardware button included in the printer 101 or can be a software button which the printer 101 displays on the display unit 205.

When starting operating in the connection setting mode, the printer 101 enables both Wi-Fi communication and BLE communication. Specifically, as processing for enabling Wi-Fi communication, the printer 101 enables the AP 209 (connection setting AP) provided inside the printer 101, which is exclusively used for the connection setting mode. This brings the printer 101 into a state of being able to establish direct connection using Wi-Fi with the host terminal 102. Connection information (an SSID or a password) required for connection to the connection setting AP is assumed to be previously stored in a setup program installed on the host terminal 102, and the host terminal 102 is assumed to previously recognize the connection information required for connection to the connection setting AP. Therefore, unlike the connection information for an AP which is enabled in the direct connection mode, the connection information required for connection to the connection setting AP is assumed to be unable to be optionally changed by the user. Furthermore, in the connection setting mode, the printer 101 can connect to the host terminal 102 not via ordinary Wi-Fi but via WFD. Thus, the printer 101 can operate as a group owner and can receive setting information from the host terminal 102 via a communication using WFD.

Moreover, as processing for enabling BLE communication, the printer 101 starts transmission of advertising information. This brings the printer 101 into a state of being able to establish connection using BLE with the host terminal 102. Furthermore, in the present exemplary embodiment, the printer 101 enters into a state of being able to receive a pairing request using BLE for a predetermined period after BLE communication is enabled. Then, upon receiving a pairing request using BLE in the predetermined period, the printer 101 performs pairing with an apparatus serving as a transmission source of the paring request and then establishes BLE connection. Upon not receiving a pairing request using BLE in the predetermined period, the printer 101 can disable BLE communication.

After enabling both Wi-Fi communication and BLE communication by the connection setting mode, the printer 101 receives setting information via those communications, and performs processing corresponding to the received setting information.

<Processing to be Performed during Initial Setting>

Figure 3:
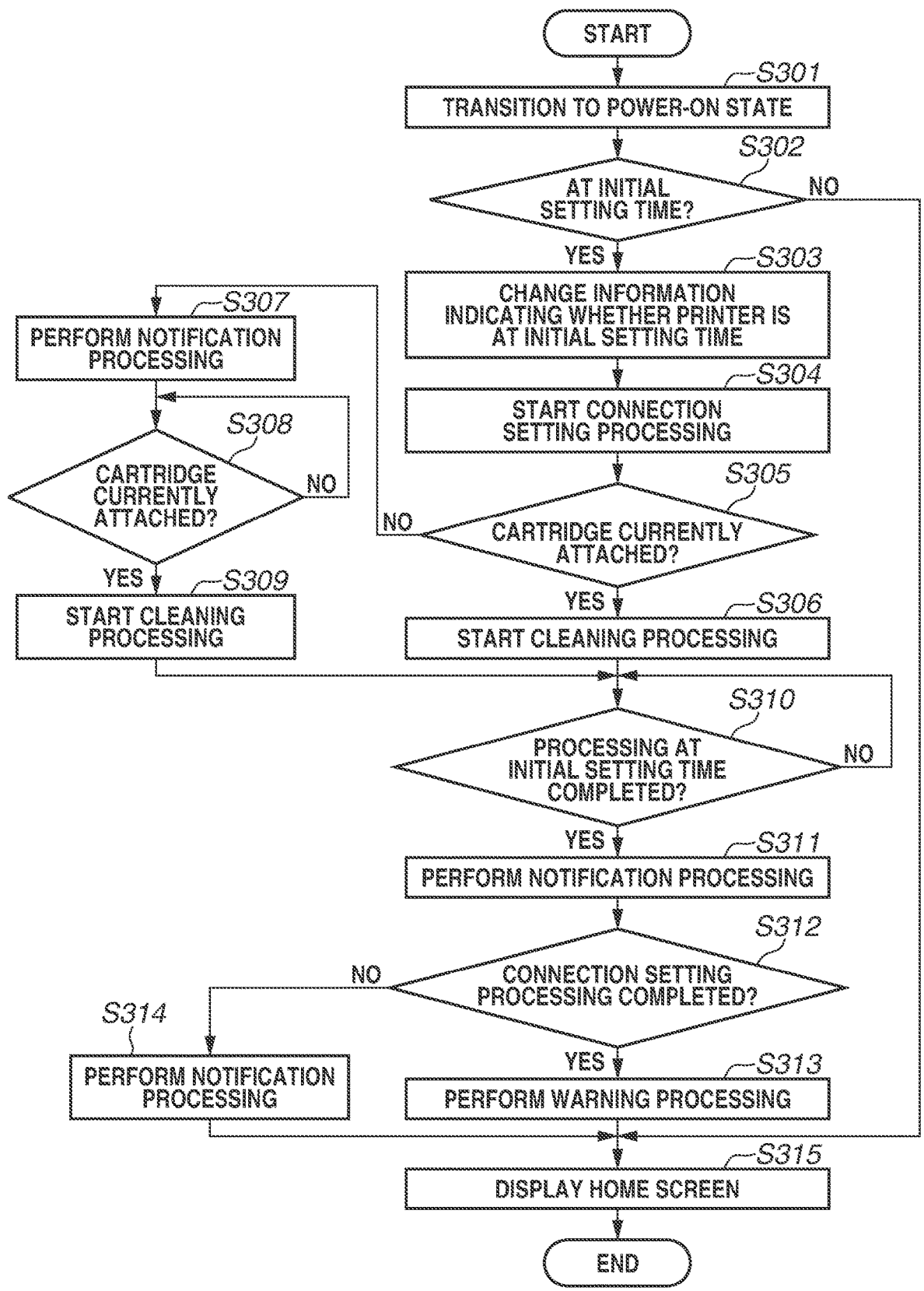
FIG. 3 is a flowchart illustrating initial setting processing which a communication apparatus performs according to one embodiment.

FIG. 3 is a flowchart illustrating initial setting processing which the printer 101 performs in the present exemplary embodiment. Furthermore, the present flowchart is assumed to be implemented by the CPU 201 loading a control program for flowchart stored in the ROM 202 or an external storage device (not illustrated) onto the RAM 203 and executing the control program. Furthermore, the present flowchart is assumed to be started with the printer 101 set in a power-off state.

First, in step S301, when detecting that a power button included in the printer 101 has been pressed (a power-on operation has been performed), the CPU 201 causes the printer 101 to transition from a power-off state to a power-on state.

Next, in step S302, the CPU 201 refers to the information indicating whether the printer 101 is at the initial setting time stored in the RAM 203 and determines whether the printer 101 is at the initial setting time. Specifically, in a case where the user has started up the printer 101 for the first time after arrival of shipment, an initial setting time flag is in an on-state in the RAM 203. On the other hand, in the start-up processing for the printer 101 performed for the second and subsequent times, the initial setting time flag is in an off-state in the RAM 203. The CPU 201 implements a determination in step S302 by referring to the on-state or off-state of the initial setting time flag. Furthermore, this determination can be implemented, for example, by determining whether the printer 101 performed an arrival time sequence in the past.

If it is determined that the printer 101 is not at the initial setting time (NO in step S302), the CPU 201 advances the processing to step S315 without performing the connection setting processing. Except for a case where, for example, a connection environment for the printer 101 has changed, usually, it is not necessary that the setting of a communication mode is reperformed when the printer 101 is not at the initial setting time. Therefore, employing such a configuration enables preventing the printer 101 from performing processing for setting a communication mode each time the printer 101 transitions to a power-on state. Furthermore, a configuration in which, at this time, the CPU 201 displays, for example, a user interface (UI) for inquiring of the user whether to perform processing for setting a communication mode and performs the processing for setting a communication mode according to a reply from the user can be employed.

On the other hand, if it is determined that the printer 101 is at the initial setting time (YES in step S302), then in step S303, the CPU 201 changes the information indicating whether the printer 101 is at the initial setting time in such a way as to be able to indicate that the time at which the printer 101 has transitioned to a power-on state for the next and subsequent times is not the initial setting time. Specifically, the CPU 201 changes the content of the initial setting time flag. Furthermore, while, in the present exemplary embodiment, the CPU 201 performs processing in step S302 with use of the on-state or off-state of the initial setting time flag, the CPU 201 can also use information other than the flag. In that case, for example, information indicating that the printer 101 is at the initial setting time is assumed to be previously stored in the RAM 203 from the time of arrival of shipment. Then, in step S302, the CPU 201 determines whether the information indicating that the printer 101 is at the initial setting time is currently stored in the RAM 203, and, in the subsequent processing, deletes the information indicating that the printer 101 is at the initial setting time. Moreover, processing in step S303 can be performed at any time after determination of whether the printer 101 is at the initial setting time.

In step S304, the CPU 201 starts connection setting processing. Details of the connection setting processing which is started in the present processing are described below with reference to FIG. 4. Furthermore, the subsequent processing is performed in parallel with the connection setting processing which is started in the present processing.

In step S305, the CPU 201 determines whether an ink cartridge is currently attached to the recording unit 212, based on a result of detection performed by the detection unit. Furthermore, in the case of a configuration in which a recording head and an ink tank are formed separately from each other, the CPU 201 determines whether at least the recording head is currently attached to the recording unit 212. If the result of determination is YES (YES in step S305), the CPU 201 advances the processing to step S306, and, if the result of determination is NO (NO in step S305), the CPU 201 advances the processing to step S307.

On the other hand, in a case where the result of determination is NO in step S305, this means that an ink cartridge is not currently attached to the recording unit 212 before the printer 101 transitions to a power-on state (i.e., while the printer 101 is in a power-off state).

Therefore, in step S307, the CPU 201 issues a notification concerning the recording unit 212 to the user by blinking a light-emitting diode (LED) of the display unit 205 or displaying a specific screen on a liquid crystal display (LCD) of the display unit 205. Specifically, the CPU 201 issues a notification indicating that the printer 101 is in a state of waiting for an ink cartridge to be attached or issues a notification indicating a method of attaching an ink cartridge. Furthermore, the method of issuing a notification is not particularly limited, and, for example, the CPU 201 can implement a notification by a voice or sound with use of a loudspeaker (not illustrated).

Then, in step S308, the CPU 201 determines whether an ink cartridge has been attached to the recording unit 212, based on a result of detection performed by the detection unit. Furthermore, in the case of a configuration in which a recording head and an ink tank are formed separately from each other, the CPU 201 determines whether both the recording head and the recording head have been attached to the recording unit 212. If the result of determination is YES (YES in step S308), the CPU 201 advances the processing to step S309, and, if the result of determination is NO (NO in step S308), the CPU 201 reperforms processing in step S308. Furthermore, a timeout is not set to the determination in step S308, and the determination in step S308 is repeated until the result of determination becomes YES or the printer 101 transitions to a power-off state. Moreover, until the result of determination in step S308 becomes YES, the CPU 201 can continue implementing the notification in step S307.

In each of steps S306 and S309, the CPU 201 starts initial setting time cleaning processing. Specifically, the CPU 201 moves a carriage to a position at which a cleaning member, such as a waste ink absorption band or a capping mechanism for capping ejection ports of the recording head, is placed. Then, the CPU 201 caps the ejection ports of the recording head with the capping mechanism, and actuates a pump connected to the capping mechanism. With this operation, the CPU 201 generates a negative pressure inside the capping mechanism to suction and discharge foreign substances, such as increased-viscosity ink and bubbles, from the ejection ports, and thus refreshes ink inside the ejection ports. Moreover, the CPU 201 wipes (performs cleaning by wiping) foreign substances, such as ink, adhering to the ejection ports of the recording head with a wiper. Furthermore, the cleaning processing is also performed at timings other than the initial setting time, such as before printing is started, when a predetermined time has elapsed from the time of the last printing, and when the printer 101 is powered on after abnormality ends. Such ordinary cleaning processing and the initial setting time cleaning processing can be different from each other. Specifically, at the initial setting time, for the purpose of filling a flow path leading from the head to the nozzle or from the ink tank to the head with ink, a negative-pressure suction force can be made higher, the amount of suction can be made larger, or the number of times of suction can be made larger than that in the ordinary cleaning operation. Alternatively, ink present inside the recording head can be heated to decrease the viscosity thereof.

Furthermore, when performing the initial setting time cleaning processing, the CPU 201 detects an error occurring in the recording unit 212. The error to be detected at this time includes, for example, a head incomplete attaching error and a carriage position error.

The head incomplete attaching error is an error in which an ink cartridge (recording head) is attached to a carriage in an incomplete manner. For example, if an ink cartridge is attached to a carriage in an incomplete manner, the ink cartridge may protrude into a drive path for the carriage. In this case, during movement of the carriage, the ink cartridge may collide with a given constituent element inside the printer 101, so that the carriage may stop at the position of the given constituent element. For example, the CPU 201 detects the amount of movement of the carriage, and, if the detected amount of movement corresponds to an amount of movement from the cartridge attaching position to the position of the given constituent element, the CPU 201 detects that the head incomplete attaching error is occurring. Moreover, for example, if an ink cartridge is attached to a carriage in an incomplete manner, the ink cartridge may come off from the carriage during movement of the carriage or during the cleaning processing. For example, the CPU 201 causes a cartridge sensor to detect whether the ink cartridge is currently attached to the carriage. Then, if it is detected by the cartridge sensor that the ink cartridge is not currently attached to the carriage, the CPU 201 detects that the head incomplete attaching error is occurring. Furthermore, since the head incomplete attaching error is resolved by the user re-opening a cover and correctly re-attaching the ink cartridge, the printer 101 does not need to transition to a power-off state to resolve the head incomplete attaching error.

The carriage position error is an error in which foreign substances are present in the drive path for the carriage. For example, if foreign substances are present in the drive path for the carriage, since the foreign substances hinder the movement of the carriage, the amount of movement of the carriage becomes smaller. Therefore, for example, the CPU 201 detects the actual amount of movement of the carriage and a force required for driving the carriage (drive force), and, if the actual amount of movement is small with respect to the drive force, the CPU 201 detects that the carriage position error is occurring. The carriage position error is resolved by the printer 101 transitioning to a power-off state and the foreign substances being removed.

When detecting an error, the CPU 201 performs error notification processing for issuing a notification of the detected error. Specifically, for example, the CPU 201 displays, on the display unit 205, a screen for issuing a notification of the detected error. Furthermore, at the time of having detecting an error, when the printer 101 is connecting to the host terminal 102 in response to the connection setting processing being started in step S304, the CPU 201 transmits, to the host terminal 102, information for causing the display unit 226 included in the host terminal 102 to display the detected error. Furthermore, a configuration in which, in a case where an inquiry has been received from the host terminal 102 to which the printer 101 is connecting, the CPU 201 performs error notification processing can be employed.

Next, after determining that the initial setting processing has been completed (YES in step S310), then in step S311, the CPU 201 issues a notification indicating that the initial setting processing has been completed to the user by blinking the LED of the display unit 205 or displaying a specific screen on the LCD of the display unit 205. Specifically, for example, the CPU 201 displays, on the LCD of the display unit 205, a screen (a screen 801 illustrated in FIG. 8) indicating that the initial setting processing has been completed to the user. Furthermore, the method of issuing a notification is not particularly limited, and, for example, the CPU 201 can implement a notification by a voice or sound with use of a loudspeaker (not illustrated).

Next, in step S312, the CPU 201 determines whether the connection setting processing started in step S304 has been completed. Furthermore, in a case where a connection mode has been set to the printer 101 and connection of the printer 101 has been established, the connection setting processing has been completed. Therefore, the present determination is processing for determining whether, by the connection setting processing started in step S304, a connection mode has been set to the printer 101 and connection of the printer 101 has been established. Moreover, the connection of the printer 101 which is established by the connection setting processing is specifically, for example, a connection using Wi-Fi between the printer 101 and the AP 103 or a connection using Wi-Fi between the printer 101 and the host terminal 102. Furthermore, a case where the connection setting processing started in step S304 has not been completed (a case where the result of determination is NO) means a case where the host terminal 102 is not connecting to the printer 101 operating in the connection setting mode. Moreover, the case where the connection setting processing started in step S304 has not been completed means, for example, a case where, while the host terminal 102 has connected to the printer 101 operating in the connection setting mode, setting information has not yet been received from the host terminal 102 and no connection mode has been set to the printer 101. If the result of determination is YES (YES in step S312), the CPU 201 advances the processing to step S313, and, if the result of determination is NO (NO in step S312), the CPU 201 advances the processing to step S314.

In step S313, the CPU 201 displays a warning screen (notification screen) which is a screen indicating that the connection setting processing has been completed and which is also a screen for prompting the user to confirm whether the connection setting processing has been performed by a user who is an owner of the printer 101. Specifically, for example, the CPU 201 displays a warning screen such as that illustrated in FIG. 10A.

A reason why this processing is performed is described as follows. As mentioned above, the connection setting processing is performed with use of a communication performed via a connection between the printer 101 and the host terminal 102. Then, any apparatus which currently recognizes connection information for connecting to the printer 101 operating in the connection setting mode is able to connect to the printer 101 operating in the connection setting mode. In the present exemplary embodiment, the connection information for connecting to the printer 101 operating in the connection setting mode is previously recognized by a wireless LAN setting application which is installed on the host terminal 102. Therefore, for example, a connection to the printer 101 may be established not by the host terminal 102 owned by the owner of the printer 101 but by the host terminal 102 owned by a third party who is not the owner of the printer 101. As a result, connection setting processing may be performed with use of a communication performed via a connection between the host terminal 102 which the third party who is not the owner of the printer 101 uses and the printer 101. Particularly, in the case of a configuration in which, as mentioned below, when the printer 101 has transitioned to the connection setting mode, a connection waiting screen for notifying the user that the preparation for connection to the host terminal 102 has been completed is not displayed, such an issue becomes more conspicuous. This is because, in a case where, due to the connection waiting screen not being displayed, the owner of the printer 101 has no awareness that the printer 101 has transitioned to the connection setting mode, a period of time in which the host terminal 102 owned by the third party is able to connect to the printer 101 may increase in length.

Therefore, in step S313, the CPU 201 issues, by the warning screen, a notification indicating that the connection setting processing has been completed during execution of the initial setting processing, thus prompting the user to confirm whether the connection setting processing which has been completed has been performed by the user who is the owner of the printer 101. Furthermore, in the present exemplary embodiment, in response to receiving a predetermined operation from the user, the printer 101 is able to cancel a connection which has been set by the connection setting processing. When having confirmed that the connection setting processing has been performed with use of a communication performed via a connection between the host terminal 102 which the third party uses and the printer 101, the user who is the owner of the printer 101 cancels (resets) the connection by performing a predetermined operation. Therefore, the warning screen can include a message for prompting the user to perform a predetermined operation in a case where the connection setting processing has been performed with use of a communication performed via a connection between the host terminal 102 which the third party uses and the printer 101. Moreover, the warning screen can include, for example, a region for receiving an instruction for canceling the connection established by the connection setting processing. After that, the CPU 201 advances the processing to step S315.

In step S314, the CPU 201 displays a notification screen for prompting the user to perform connection setting processing. Specifically, for example, the CPU 201 displays a notification screen such as that illustrated in FIG. 10B. Furthermore, the notification screen can include, for example, a region for issuing a notification for a method of performing the connection setting processing. Moreover, the region can be, for example, a QR Code® for displaying a web page indicating a method of performing the connection setting processing. The user is allowed to read the QR code by an optional terminal device to cause the optional terminal device to display a web page indicating a method of performing the connection setting processing. After that, the CPU 201 advances the processing to step S315.

Figure 5:
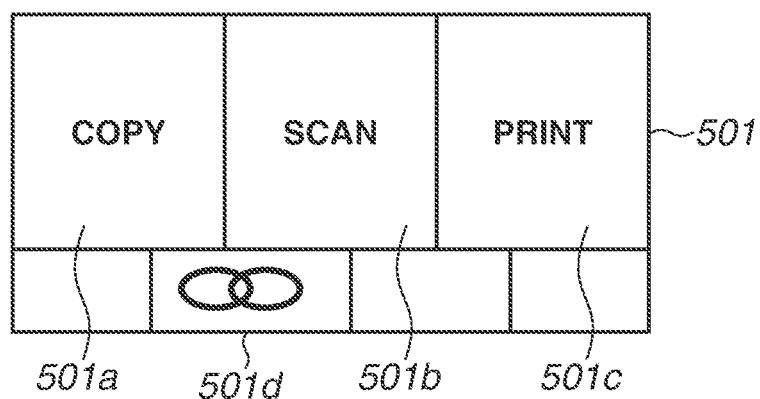
FIG. 5 is a diagram illustrating an example of a screen which the communication apparatus displays according to one embodiment.

In step S315, the CPU 201 displays a home screen (for example, a screen 501 illustrated in FIG. 5) on the display unit 205. The home screen can include, for example, a region 501a for receiving an execution instruction for copy processing, a region 501b for receiving an execution instruction for scan processing, and a region 501c for receiving an execution instruction for print processing. Moreover, the home screen can further include, for example, a region 501d for receiving a transition instruction for the connection setting mode. After that, the CPU 201 ends the initial setting processing. Furthermore, from this time, the CPU 201 is able to receive a user operation performed on the home screen to perform various processing operations.

Furthermore, in step S312, the CPU 201 can determine whether the host terminal 102 has connected to the printer 101 operating in the connection setting mode. In this configuration, even in a case where, while the host terminal 102 has connected to the printer 101 operating in the connection setting mode, setting information has not yet been received from the host terminal 102 and no connection mode has been set to the printer 101, the result of determination becomes YES. Moreover, in this configuration, the warning screen which is displayed in step S313 can be a screen indicating that the host terminal 102 has connected to the printer 101 during execution of the initial setting processing.

Moreover, a configuration in which, if the result of determination in step S312 is NO, the CPU 201 advances the processing to step S315 without performing processing in step S314 can be employed.

As described above, in the present exemplary embodiment, the connection setting processing is performed. Furthermore, the connection setting processing includes processing which is started at the initial setting time and processing which is started after ending of initial setting. The connection setting processing which is started at the initial setting time is specifically processing which is started by step S304 illustrated in FIG. 3 being performed. The connection setting processing which is started after ending of initial setting is processing which is started based a predetermined operation for performing the connection setting processing being performed on the printer 101 in a state in which the printer 101 is in a power-on state after ending of initial setting. The operation performed on the printer 101 includes specifically, for example, pressing of the region 501d and an operation performed on a specific region in a setting screen which is displayed after an operation performed on a region other than the regions 501a to 501d in the home screen.

Furthermore, as mentioned above, in the initial setting processing, to perform initial setting of the printer 101, the user continuously performs various operations. At this time, during the process of continuously performing various operations, the user may accidentally perform an operation for canceling the connection setting mode of the printer 101. As a result, connection setting processing which is started at the initial setting time may be interrupted or stopped without intention of the user. Moreover, in that case, there is an issue in which, even when the user intends to perform connection setting processing by operating the host terminal 102, since the printer 101 is not operating in the connection setting mode, the user is not able to perform the connection setting processing. Alternatively, the user may take a lot of trouble of causing the printer 101 to operate in the connection setting mode again. Therefore, in the present exemplary embodiment, the CPU 201 performs processing for resolving the above-mentioned issues.

Figure 4:
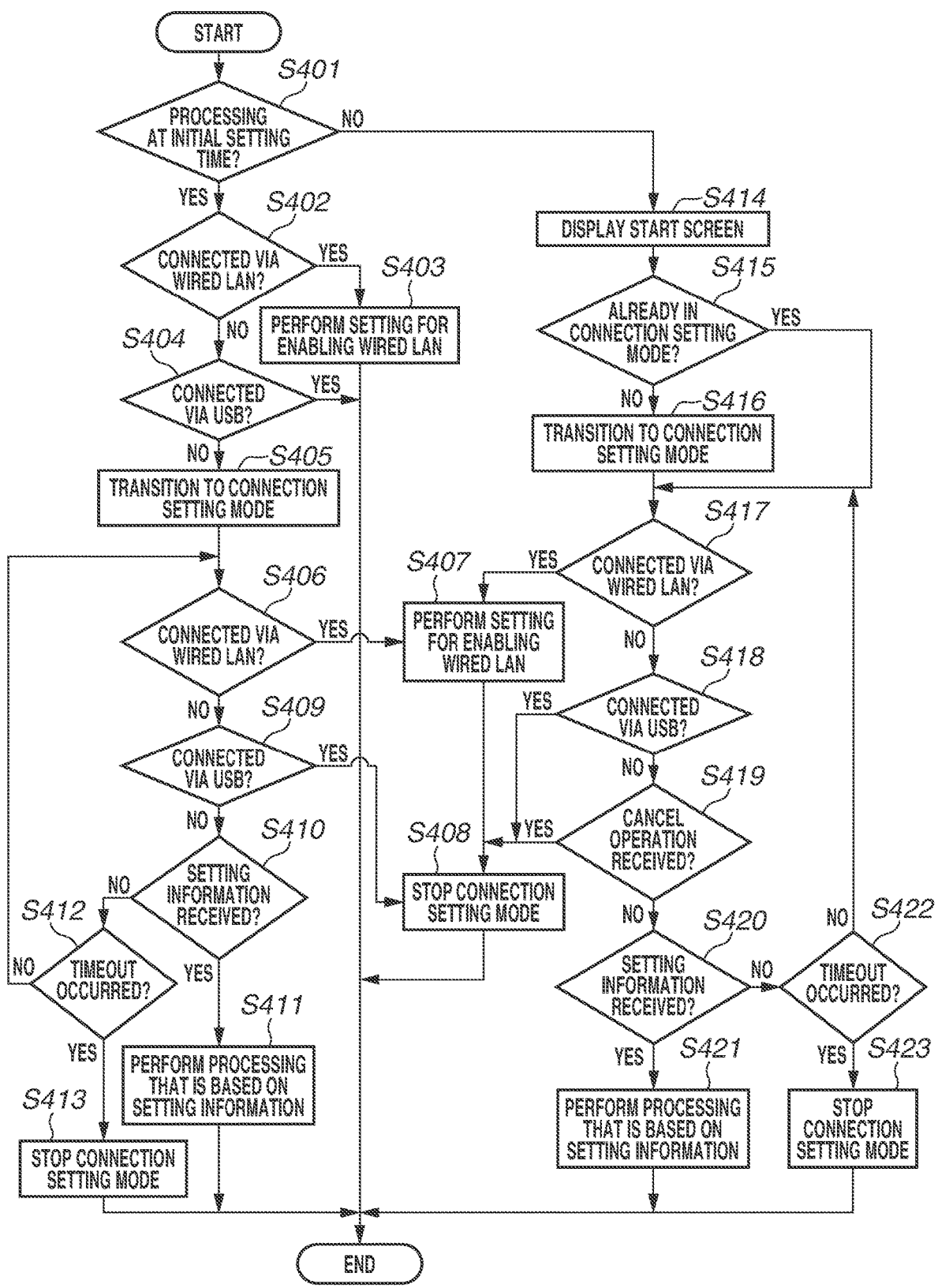
FIG. 4 is a flowchart illustrating connection setting processing which the communication apparatus performs according to one embodiment.

FIG. 4 is a flowchart illustrating connection setting processing which the printer 101 performs. Furthermore, the present flowchart is assumed to be implemented by the CPU 201 loading a control program for flowchart stored in the ROM 202 or an external storage device (not illustrated) onto the RAM 203 and executing the control program. Furthermore, processing illustrated in the present flowchart is, for example, processing which is started by step S304 illustrated in FIG. 3 being performed. Moreover, processing illustrated in the present flowchart is, for example, processing which is started by pressing of the region 501d being performed.

First, in step S401, the CPU 201 determines whether the connection setting processing which the CPU 201 is currently performing is processing which is started at the initial setting time (is processing which is started after ending of initial setting). Specifically, the CPU 201 determines whether processing serving as a trigger for starting of the present flowchart is processing in step S304 or pressing of the region 501d. If the result of determination is YES (YES in step S401), the CPU 201 advances the processing to step S402, and, if the result of determination is NO (NO in step S401), the CPU 201 advances the processing to step S414.

In step S402, the CPU 201 determines whether the printer 101 is connecting to another apparatus via a wired LAN. If the result of determination is YES (YES in step S402), the CPU 201 advances the processing to step S403, and, if the result of determination is NO (NO in step S402), the CPU 201 advances the processing to step S404.

In step S403, the CPU 201 enables a wired LAN function of the printer 101 and then transitions to a state of being able to perform communication with an apparatus to which the printer 101 is connecting via a wired LAN. Furthermore, in the present exemplary embodiment, in a state in which the wired LAN function is enabled, a wireless LAN function is assumed to be disabled. After that, the CPU 201 ends the processing.

On the other hand, in step S404, the CPU 201 determines whether the printer 101 is connecting to another apparatus via a USB. If the result of determination is YES (YES in step S404), the CPU 201 ends the processing, and, if the result of determination is NO (NO in step S404), the CPU 201 advances the processing to step S405.

In this way, in the present exemplary embodiment, in a case where the printer 101 is connecting to another apparatus via a wired LAN or a USB, the CPU 201 does not cause the printer 101 to operate in the connection setting mode. This is because, in a case where the printer 101 is connecting to another apparatus via a wired LAN or a USB, since a wired LAN or a USB is identified as a method of performing communication with another apparatus, there is no need to perform connection setting processing anew.

In step S405, the CPU 201 causes the printer 101 to transition to the connection setting mode. This causes the printer 101 to enable the AP 209 for the connection setting mode. Thus, the printer 101 enters into a state of periodically emitting a beacon signal including, for example, the SSID of the printer 101 and, therefore, enters into a state of being able to provide information included in the beacon signal with respect to an AP search from a terminal apparatus (for example, the host terminal 102). When, in this state, a connection request is transmitted from the host terminal 102, for example, exchange of connection parameters is performed between apparatuses, so that the printer 101 and the host terminal 102 connect to each other via the AP 209. Furthermore, at this time, the printer 101 can enable the BLE function and thus start broadcasting of advertising information. Furthermore, in the present exemplary embodiment, in the connection setting processing at the initial setting time, even if the printer 101 has transitioned to the connection setting mode, the CPU 201 does not notify the user that the printer 101 has transitioned to the connection setting mode. Specifically, the CPU 201 does not blink the LED of the display unit 205 or display a specific screen on the LCD of the display unit 205 based on a transition to the connection setting mode. Moreover, even if the printer 101 has transitioned to the connection setting mode, the CPU 201 does not display a connection waiting screen for notifying the user that the preparation for connection to the host terminal 102 has been completed. Moreover, as mentioned above, the processing in the present flowchart and the processing in the flowchart illustrated in FIG. 3 can be performed in parallel. Therefore, for example, even during a period in which the initial setting processing illustrated in FIG. 3 is being performed, the printer 101 can operate in the connection setting mode. Moreover, even after the initial setting processing is completed and the home screen is displayed, the printer 101 can operate while maintaining being in the connection setting mode. Moreover, for example, even during a period in which, in response to a user operation performed after the home screen is displayed (for example, pressing of the region 501a, the region 501b, or the region 501c), the printer 101 is performing various operations such as printing, scanning, and copying, the printer 101 can operate in the connection setting mode.

Figure 6:
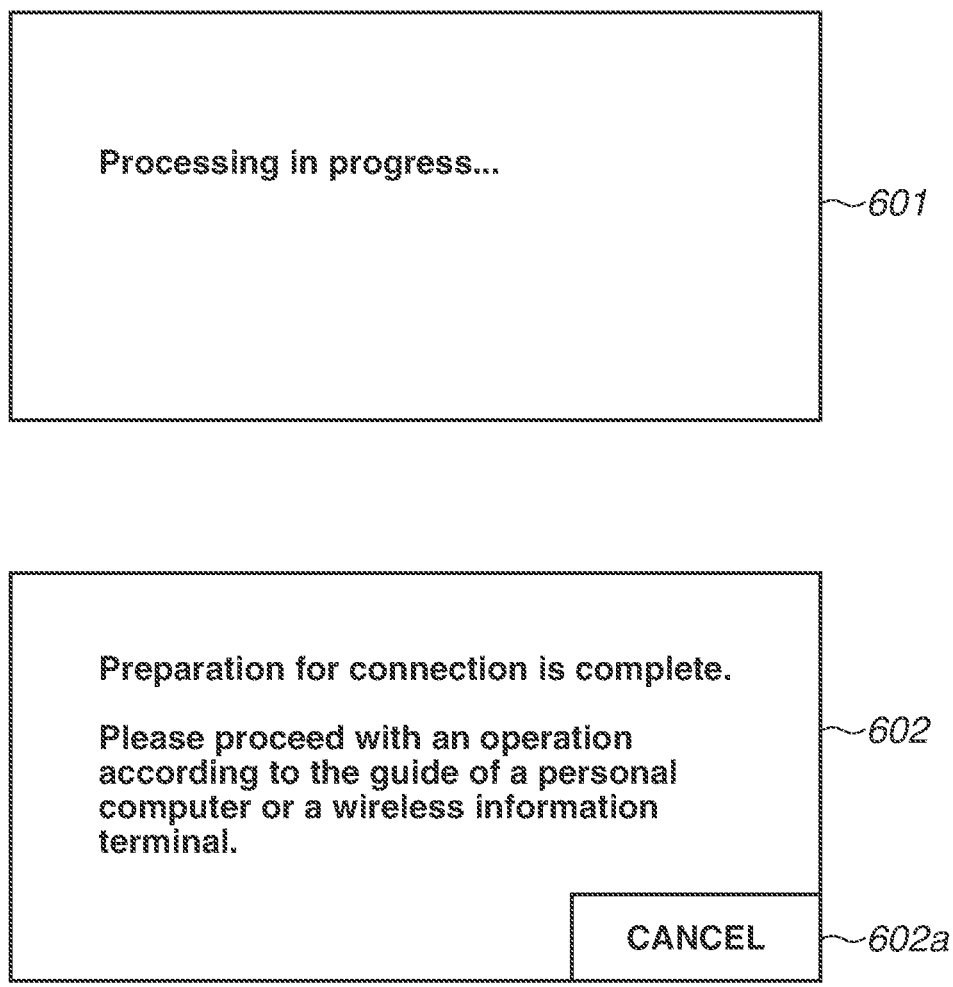
FIG. 6 is a diagram illustrating examples of screens which the communication apparatus displays according to one embodiment.

Furthermore, the present exemplary embodiment is not limited to this, and, when the printer 101 has transitioned to the connection setting mode, the CPU 201 can display a connection waiting screen (for example, a screen 602 illustrated in FIG. 6) for notifying the user that the preparation for connection to the host terminal 102 has been completed.

In step S406, the CPU 201 determines whether the printer 101 is connecting to another apparatus via a wired LAN. The present processing is similar to processing in step S402.

Furthermore, at this time, the printer 101 is operating in the connection setting mode and is in a state of enabling the wireless LAN function. For example, if a configuration in which, when the wireless LAN function is currently enabled, the wired LAN function shall be disabled is employed, the present processing can be omitted. If the result of determination is YES (YES in step S406), the CPU 201 advances the processing to step S407, and, if the result of determination is NO (NO in step S406), the CPU 201 advances the processing to step S409.

In step S407, the CPU 201 enables the wired LAN function of the printer 101 and then transitions to a state of being able to perform communication with an apparatus to which the printer 101 is connecting via a wired LAN. The present processing is similar to processing in step S403.

In step S408, the CPU 201 stops the printer 101 from operating in the connection setting mode. With this, the printer 101 disables the AP 209 for the connection setting mode and stops transmission of a beacon signal. Moreover, the printer 101 disables the BLE function, stops broadcasting of advertising information, and enters into a state of not newly receiving an execution instruction for pairing processing. Furthermore, when already establishing BLE connection to another apparatus, even if stopping operating in the connection setting mode, the printer 101 can maintain the established BLE connection. After that, the CPU 201 ends the processing.

On the other hand, In step S409, the CPU 201 determines whether the printer 101 is connecting to another apparatus via a USB. The present processing is similar to processing in step S404. If the result of determination is YES (YES in step S409), the CPU 201 advances the processing to step S408, and, if the result of determination is NO (NO in step S409), the CPU 201 advances the processing to step S410.

In this way, in the present exemplary embodiment, in a case where the printer 101 is connecting to another apparatus via a wired LAN or a USB, the CPU 201 stops the printer 101 from operating in the connection setting mode. The case where the printer 101 is connecting to another apparatus via a wired LAN or a USB is specifically a case where, after the printer 101 has transitioned to the connection setting mode, the printer 101 has connected to another apparatus via a wired LAN or a USB. This is because, in a case where the printer 101 has connected to another apparatus via a wired LAN or a USB, since a wired LAN or a USB is identified as a method of performing communication with another apparatus, there is no need to perform connection setting processing anew.

In step S410, the CPU 201 determines whether the printer 101 has received setting information from an apparatus (here, the host terminal 102) which has connected to the printer 101 operating in the connection setting mode. If the result of determination is YES (YES in step S410), the CPU 201 advances the processing to step S411, and, if the result of determination is NO (NO in step S410), the CPU 201 advances the processing to step S412.

In step S411, the CPU 201 performs processing that is based on the setting information received from the host terminal 102. Specifically, first, the CPU 201 cancels (stops) the connection setting mode. With this, the CPU 201 performs control in such a manner that the connection setting mode and another mode (the infrastructure connection mode or the direct connection mode) do not simultaneously operate. Furthermore, cancellation of the connection setting mode causes a connection between the host terminal 102 and the printer 101 to be temporarily severed. After that, the CPU 201 performs setting of a communication mode that is based on the received setting information. Specifically, when receiving, as setting information, information corresponding to the infrastructure connection mode (for example, AP information), the CPU 201 registers an AP corresponding to the setting information, as an AP which is used for the infrastructure connection mode, with the RAM 203 and then performs connection processing with the AP. Moreover, in a case where an encryption key is required to use an AP, the CPU 201 performs, for example, registration of the encryption key. Then, after registration of the AP is appropriately ended, the CPU 201 sets the printer 101 to the infrastructure connection mode for enabling a connection to be performed via the registered AP. With this, the printer 101 operates in a state of being able to perform wireless connection to the host terminal 102 via the registered AP. Moreover, when having received, as setting information, information corresponding to the WFD mode or the software AP mode, the CPU 201 transmits, to the host terminal 102 before canceling the connection setting mode, connection information used for connecting to an AP corresponding to the WFD mode or the software AP mode. Then, after canceling the connection setting mode, the CPU 201 enables the AP corresponding to the WFD mode or the software AP mode and then operates in the WFD mode or the software AP mode. When, in this state, having received, from the host terminal 102 serving as a transmission source of setting information, a connection request including the connection information transmitted before cancellation of the connection setting mode, the CPU 201 causes the printer 101 and the host terminal 102 to connect to each other by the P2P method. With this, the printer 101 operates in a state of being able to perform wireless connection to the host terminal 102 by the P2P method. Furthermore, in the present exemplary embodiment, in the connection setting processing at the initial setting time, even if processing that is based on setting information is performed, various notifications that are based on execution of the processing that is based on setting information are not issued. After that, the CPU 201 ends the connection setting processing illustrated in FIG. 4.

Furthermore, as mentioned above, in the present exemplary embodiment, in a case where the connection setting processing at the initial setting time is completed during execution of initial setting processing, a warning screen is displayed by the processing in step S313.

On the other hand, in step S412, the CPU 201 determines whether a timeout has occurred in the connection setting processing. The timeout in the connection setting processing means that the printer 101 does not connect to an apparatus other than the printer 101 or does not receive setting information for a predetermined time or more after the printer 101 has transitioned to the connection setting mode in step S405. If the result of determination is YES (YES in step S412), the CPU 201 advances the processing to step S413. Furthermore, at this time, the CPU 201 can inform the user by causing the display unit 205 to display that a timeout has occurred or that a USB connection to a terminal apparatus is recommended. If the result of determination is NO (NO in step S412), the CPU 201 returns the processing to step S406.

In step S413, the CPU 201 stops the printer 101 from operating in the connection setting mode. The present processing is similar to processing in step S408. After that, the CPU 201 ends the connection setting processing illustrated in FIG. 4.

The connection setting processing at the initial setting time is performed in the above-described way. Furthermore, in the present exemplary embodiment, the CPU 201 does not receive, from the user, a cancel operation for canceling (stopping) the connection setting mode which has been started for operation in step S405. Thus, for example, the CPU 201 does not display a screen for receiving an input for canceling the connection setting mode which has been started for operation in step S405. Moreover, for example, the CPU 201 does not cancel the connection setting mode even if a cancel button included in the printer 101 has been pressed. Furthermore, in the present exemplary embodiment, the state of not receiving a cancel operation from the user is assumed to be continued even after the initial setting has been completed. Moreover, although a period in which the printer 101 does not receive a cancel operation is not limited, the printer 101 is assumed not to receive a cancel operation at least during a period from the time when the initial setting is started to the time when the initial setting is complete and the home screen is displayed. In the present exemplary embodiment, the connection setting mode which has been started for operation in step S405 is stopped or ended when a timeout has occurred, when the printer 101 has been powered off, when the connection setting processing has been completed, or when the printer 101 has connected to another apparatus by a wired communication standard such as a wired LAN or a USB. Moreover, in the present exemplary embodiment, the printer 101 is able to directly receive an input of connection information (for example, a password) from the user and perform connection processing with an AP. In the present exemplary embodiment, the connection setting mode which has been started for operation in step S405 is assumed to be stopped or ended even when the printer 101 has connected to an AP based on an input from the user.

Furthermore, the present exemplary embodiment is not limited to this, and, for example, the CPU 201 can be configured to be able to receive, from the user, a cancel operation for canceling (stopping) the connection setting mode which has been started for operation in step S405.

In step S414, which is performed in a case where the result of determination in step S401 is NO (in a case where the printer 101 is not at the initial setting time), the CPU 201 displays a start screen for notifying the user of starting an operation in the connection setting mode. The start screen includes, for example, a button used for receiving, from the user, an instruction for starting an operation in the connection setting mode. When the button included in the start screen has been pressed, the CPU 201 advances the processing to step S415.

In step S415, the CPU 201 determines whether the printer 101 is already in the connection setting mode. Furthermore, the result of determination becomes YES, for example, in a case where the region 501d has been pressed in a state in which the printer 101 is already operating in the connection setting mode by the connection setting processing which has been started at the initial setting time. If the result of determination is YES (YES in step S415), the CPU 201 advances the processing to step S417, and, if the result of determination is NO (NO in step S415), the CPU 201 advances the processing to step S416.

In step S416, the CPU 201 causes the printer 101 to start operating in the connection setting mode. The present processing is similar to processing in step S405. Furthermore, unlike at the initial setting time, at this time, the CPU 201 causes the display unit 205 to issue various notifications that are based on the transition to the connection setting mode. Specifically, for example, during the process in which the printer 101 is transitioning to the connection setting mode, the CPU 201 displays a screen (for example, a screen 601 illustrated in FIG. 6) indicating that the printer 101 is transitioning to the connection setting mode. Then, in a state in which the printer 101 has completed transitioning to the connection setting mode and is operating in the connection setting mode, the CPU 201 displays a connection waiting screen for notifying the user that the printer 101 is operating in the connection setting mode and the preparation of connection to the host terminal 102 has been completed. The connection waiting screen is, for example, a screen 602 illustrated in FIG. 6. Furthermore, the screen 602 includes a region 602a used for canceling the connection setting mode. Thus, unlike at the initial setting time, at this time, the CPU 201 is able to accept a cancel instruction for canceling the connection setting mode. Furthermore, operations which the user should perform in the connection setting processing are described in an instruction manual shipped with the printer 101. Therefore, the screen 602 can include a message which is displayed to advise the user of proceeding with an operation according to the instruction manual. Moreover, while, in the above description, a configuration of performing displaying of a screen on the LCD as a notification that is based on the transitioning to the connection setting mode is employed, for example, blinking of the LED as a notification that is based on the transitioning to the connection setting mode can be performed.

In step S417, the CPU 201 determines whether the printer 101 is connecting to another apparatus via a wired LAN. The present processing is similar to processing in step S402. If the result of determination is YES (YES in step S417), the CPU 201 advances the processing to step S407, and, if the result of determination is NO (NO in step S417), the CPU 201 advances the processing to step S418.

In step S418, the CPU 201 determines whether the printer 101 is connecting to another apparatus via a USB. The present processing is similar to processing in step S404. If the result of determination is YES (YES in step S418), the CPU 201 advances the processing to step S408, and, if the result of determination is NO (NO in step S418), the CPU 201 advances the processing to step S419.

Furthermore, at this time, unlike at the initial setting time, the printer 101 is operating in the connection setting mode in response to the transition to the connection setting mode an instruction for which having been expressly issued by the user. Thus, at this time, there is a high possibility that the user intends to cause the printer 101 to establish wireless connection. Therefore, the CPU 201 can omit processing in step S417 or S418. Thus, the CPU 201 can maintain an operation which is performed in the connection setting mode even if the printer 101 is connecting to another apparatus via a wired LAN or a USB.

In step S419, the CPU 201 determines whether a cancel operation for canceling (stopping) the connection setting mode which has been started for operation in step S416 has been received from the user. The cancel operation is specifically, for example, pressing of the region 602a displayed in the screen 602 or pressing of a cancel button which is a physical button. If the result of determination is YES (YES in step S419), the CPU 201 advances the processing to step S408, and, if the result of determination is NO (NO in step S419), the CPU 201 advances the processing to step S420.

In step S420, the CPU 201 determines whether setting information has been received from an apparatus (here, the host terminal 102) which has connected to the printer 101 operating in the connection setting mode. If the result of determination is YES (YES in step S420), the CPU 201 advances the processing to step S421, and, if the result of determination is NO (NO in step S420), the CPU 201 advances the processing to step S422.

Figure 7:
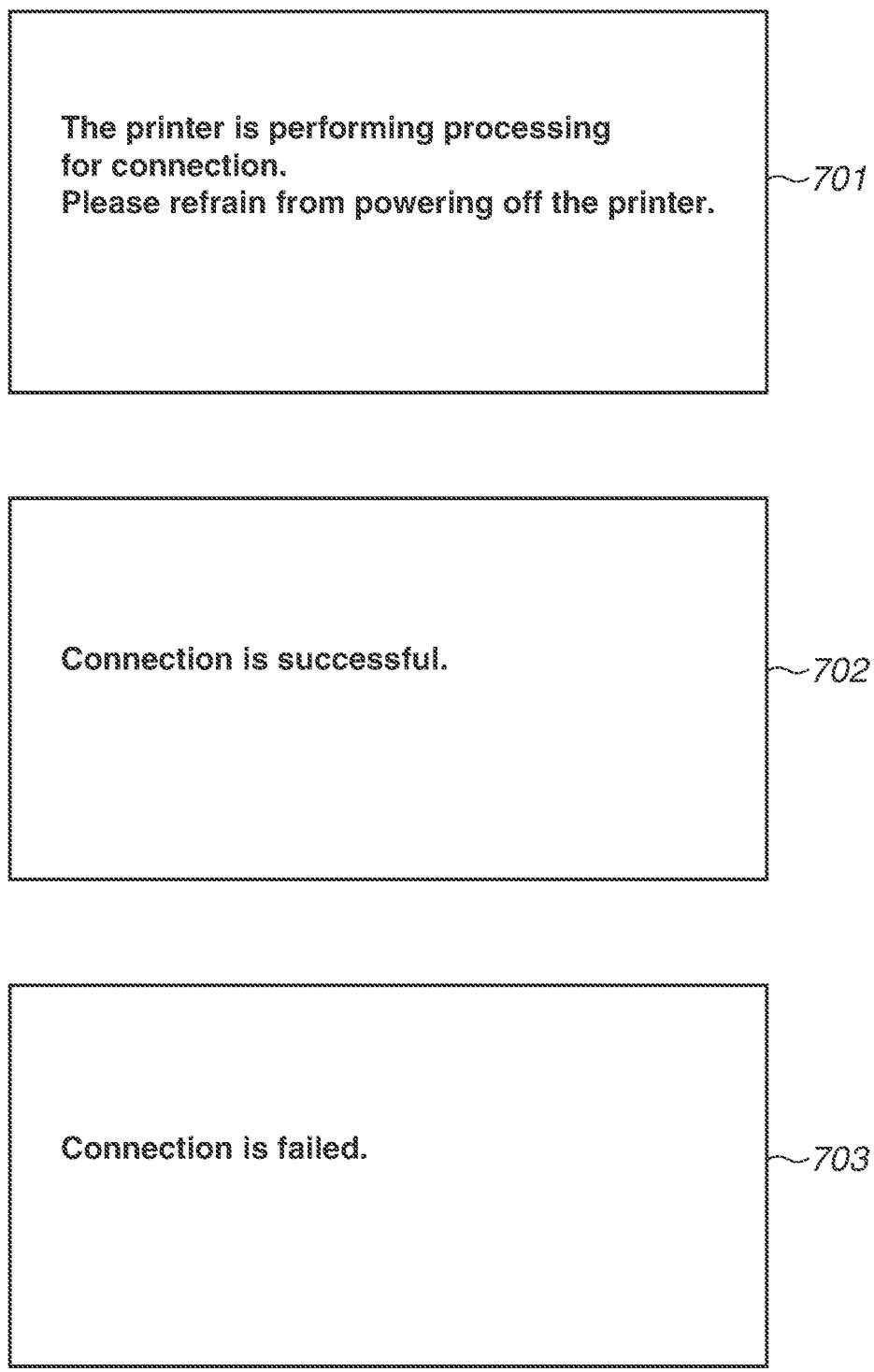
FIG. 7 is a diagram illustrating examples of screens which the communication apparatus displays according to one embodiment.

In step S421, the CPU 201 performs processing that is based on the setting information received from the host terminal 102. The present processing is similar to processing in step S411. Furthermore, unlike at the initial setting time, at this time, the CPU 201 causes the display unit 205 to issue various notifications that are based on execution of processing that is based on the setting information. Specifically, for example, during the process in which the printer 101 is performing connection processing to an AP corresponding to the setting information, the CPU 201 displays a screen (for example, a screen 701 illustrated in FIG. 7) indicating that the printer 101 is performing connection processing to the AP. Then, if the connection to the AP is successful, the CPU 201 displays a screen (for example, a screen 702 illustrated in FIG. 7) for notifying the user that the connection to the AP is successful. On the other hand, if the connection to the AP is failed, the CPU 201 displays a screen (for example, a screen 703 illustrated in FIG. 7) for notifying the user that the connection to the AP is failed. After that, the CPU 201 ends the connection setting processing illustrated in FIG. 4.

Figures 10A, 10B:
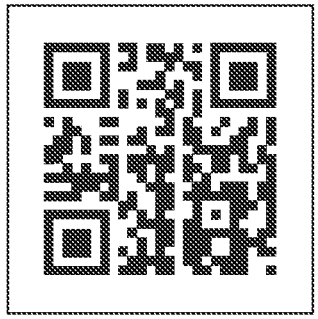
FIGS. 10A and 10B are diagrams each illustrating an example of a screen which the communication apparatus displays according to one embodiment.

Furthermore, in the present exemplary embodiment, in a case where connection setting processing which is not at the initial setting time has been completed, a warning screen such as that illustrated in FIG. 10A is not displayed. This is because, in the connection setting processing which is not at the initial setting time, there is a high possibility that the owner of the printer 101 has an awareness that the printer 101 is operating in the connection setting mode. As a result, this is because there is a high possibility that the connection setting processing is completed by the owner of the printer 101 before a third party performs connection setting processing.

On the other hand, in step S422, the CPU 201 determines whether a timeout has occurred in the connection setting processing. The present processing is similar to processing in step S412. Furthermore, a threshold value for a time used for the timeout determination in step S422 can be different from a threshold value for a time used for the timeout determination in step S412. In the present exemplary embodiment, the threshold value for a time used for the timeout determination in step S422 is assumed to be larger than the threshold value for a time used for the timeout determination in step S412. If the result of determination is YES (YES in step S422), the CPU 201 advances the processing to step S423, and, if the result of determination is NO (NO in step S422), the CPU 201 returns the processing to step S417.

In step S423, the CPU 201 stops the printer 101 from operating in the connection setting mode. The present processing is similar to processing in step S408. After that, the CPU 201 ends the connection setting processing illustrated in FIG. 4.

FIG. 9 is a flowchart illustrating connection setting processing which the host terminal 102 performs. Furthermore, the present flowchart is assumed to be implemented by the CPU 221 loading a control program for flowchart stored in the ROM 222 or an external storage device (not illustrated) onto the RAM 223 and executing the control program.

First, in step S901, the CPU 221 activates a wireless LAN setting application in response to receiving a user operation. The following processing for setting a communication mode is implemented by the CPU 221 executing the wireless LAN setting application.

Here, an example of setting the printer 101 to the infrastructure connection mode by the wireless LAN setting application registering an AP which is used for the infrastructure connection mode with the printer 101 is described. Furthermore, registration of an AP can be performed not with use of the wireless LAN setting application but with use of, for example, a service on the Internet via a web browser or other functions of the host terminal 102 and the printer 101. Moreover, at this time, the CPU 221 temporarily stores, in the RAM 223, AP information about an AP to which the host terminal 102 is connecting.

Next, in step S902, the CPU 221 causes the communication unit 224 to search for an AP which the host terminal 102 is able to access. Searching for an AP can be automatically performed at the time of activation of the wireless LAN setting application or can be performed in response to an instruction from the user. Searching for an AP is performed by the communication unit 224 receiving a beacon signal which each AP emits.

In step S903, the CPU 221 causes the display unit 226 to display a list of APs found by the AP searching performed in step S902 (an AP search result). At this time, for example, the CPU 221 causes the display unit 226 to display a list of SSIDs included in the respective APs. Furthermore, a configuration in which, in step S903, the CPU 221 automatically extracts an AP having an SSID of the format compliant with the above-mentioned rule constituting an SSID of the AP 209 and displays the extracted AP can be employed. At this time, in a case where a plurality of SSIDs of the format compliant with the above-mentioned rule has been found, the CPU 221 causes the display unit 226 to display such a plurality of SSIDs and allows the user to select an SSID therefrom. Moreover, in a case where such a configuration is employed, processing in step S905 described below does not need to be performed.

When displaying of APs is performed in step S903, the user selects an AP included in a communication apparatus serving as a target for setting a communication mode from the search result.

In step S904, the CPU 221 detects reception of an AP having being selected by the user.

In step S905, the CPU 221 determines whether the AP selected in step S904 is an AP included in a communication apparatus serving as a target for setting by the wireless LAN setting application. At this time, specifically, the CPU 221 determines whether the selected AP is an AP having an SSID of the format compliant with the above-mentioned rule constituting the SSID of the AP 209. If it is determined that the selected AP is not an AP included in a communication apparatus serving as a setting target (NO in step S905), the CPU 221 waits for selection of an AP to be performed by the user again. Furthermore, at this time, the CPU 221 can display, on the display unit 226, a screen for communicating to the user that an inappropriate AP has been selected. Moreover, a configuration in which, in a case where there is no applicable AP in a communication apparatus serving as a setting target or in a case where there is no AP included in a communication apparatus desired by the user, the CPU 221 ends the processing can be employed.

Furthermore, while, in the above description, a configuration in which processing in steps S903 to S905 is performed to cause the user to manually select an AP included in a communication apparatus serving as a target for setting a communication mode has been described, the present exemplary embodiment is not limited to this. For example, the CPU 221 can be configured to automatically select, from the APs found by searching in step S902, an AP having an SSID of the format compliant with the above-mentioned rule as an AP included in a communication apparatus serving as a target for setting a communication mode.

In a case where a communication apparatus serving as a setting target (here, the AP 209 included in the printer 101) has been selected in step S905, the CPU 221 performs, for example, exchange of parameters (connection information) required for the host terminal 102 and the printer 101 to perform wireless connection with each other. Furthermore, connection information required for connection to the AP 209 is previously retained by the wireless LAN setting application. In this way, the host terminal 102 connects to the AP 209 and thus establishes communication with the printer 101.

Next, in step S906, the CPU 221 transmits the AP information temporarily stored in the RAM 223 in step S901 as setting information to the printer 101 via the AP 209 to which the CPU 221 has connected in step S905. Upon receiving the AP information, the printer 101 is set to an infrastructure connection mode which enables connection to be performed via an AP that is based on the AP information.

Finally, in step S907, the CPU 221 stops connection to the AP 209, and then re-connects to an AP that is based on the AP information temporarily stored in the RAM 223 in step S901, thus becoming able to perform communication with the printer 101 via the re-connected AP. At this time, the CPU 221 registers, with the RAM 223, the printer 101 as a communication apparatus to which the host terminal 102 connects from this point of time. After that, the CPU 221 terminates the wireless LAN setting application.

Furthermore, processing in steps S902 to S904 does not necessarily need to be performed by the wireless LAN setting application, and a configuration in which another application previously stored on the host terminal 102 searches for the AP 209 and the wireless LAN setting application acquires a result of the search can be employed.

Moreover, in the above description, the CPU 221 performs communication with the printer 101 via the AP 209, and, therefore, transmits setting information to the printer 101 according to a communication standard compliant with the IEEE 802.11 series (i.e., Wi-Fi®). However, the present exemplary embodiment is not limited to this, and, for example, the CPU 221 can transmit setting information to the printer 101 according to a communication standard different from the communication standard compliant with the IEEE 802.11 series. The communication standard which is used at this time is, for example, Bluetooth® Classic, Bluetooth® Low Energy, Near Field Communication, or Wi-Fi Aware®. Employing such a configuration enables the CPU 221 to transmit setting information to the printer 101 according to another communication standard while maintaining connection using Wi-Fi with an AP which is used for the infrastructure connection mode.

Moreover, while, in the above description, a configuration in which the CPU 221 sets the infrastructure connection mode to the printer 101 has been described, the present exemplary embodiment is not limited to this configuration. For example, the CPU 221 can set another communication mode, such as the WFD mode or the software AP mode, to the printer 101. For example, a communication mode to be set to the printer 101 can be determined by receiving a selection performed by the user via a screen which is displayed by the wireless LAN setting application or can be automatically determined by the wireless LAN setting application based on a communication environment of the host terminal 102. For example, in a case where, at the time of setting a communication mode to the printer 101, the host terminal 102 is connecting to any AP, the infrastructure connection mode is selected as a communication mode to be set to the printer 101. Moreover, for example, in a case where, at the time of setting a communication mode to the printer 101, the host terminal 102 is not connecting to any AP, a communication mode of the P2P method, such as the WFD mode or the software AP mode, is selected as a communication mode to be set to the printer 101.

As mentioned above, in a case where the connection setting processing is completed during the process of initial setting, the present exemplary embodiment displays a warning screen to prompt the user to confirm whether the connection setting processing has not been performed by a third party. With this, even if the connection setting processing has been performed by a third party, the present exemplary embodiment is able to notify the user of that effect. As a result, in a case where the connection setting processing has been performed by a third party, the present exemplary embodiment is able to promptly cancel a connection established by the connection setting processing performed by the third party.

Moreover, the printer 101 does not accept a cancel instruction for connection setting processing which is started at the initial setting time. This enables preventing or reducing the printer 101 from stopping the connection setting mode without the intention of the user due to the user accidentally performing a cancel operation.

Moreover, the present exemplary embodiment makes connection setting processing which is started at the initial setting time and connection setting processing which is started based on a user operation after completion of initial setting different from each other in content of the processing. Specifically, in the connection setting processing which is started after completion of initial setting, various notifications and various types of displaying which would not be performed in the connection setting processing which is started at the initial setting time are performed. Moreover, in the connection setting processing which is started after completion of initial setting, the printer 101 accepts a cancel instruction for connection setting processing. This is because, even if the user accidentally cancels the connection setting processing which is started based on a user operation after completion of initial setting, the user can perform a user operation again to re-start the connection setting processing.

The printer 101 can be configured to be able to perform, in addition to connection setting processing using Wi-Fi and connection setting processing using BLE, for example, connection setting processing using a wired LAN or a USB. In that case, the host terminal 102 connects to the printer 101 via a wired LAN or a USB and communicates infrastructure setting information or direct setting information via the wired LAN or the USB, thus performing connection setting processing. Furthermore, as mentioned above, when having already connected to the host terminal 102 via a wired LAN or a USB at the initial setting time, the printer 101 cancels the connection setting mode. Therefore, the printer 101 is assumed to be able to perform the connection setting processing using a wired LAN or a USB even if the printer 101 is not operating in the connection setting mode. Moreover, unlike connection setting processing using wireless communication such as Wi-Fi or BLE, the connection setting processing using a wired LAN or a USB is unlikely to be performed by a third party. Therefore, even if connection setting processing is completed during the process of initial setting, in a case where the completed connection setting processing is connection setting processing using a wired LAN or a USB, displaying of a warning screen is assumed not to be performed.

While, in the above-described exemplary embodiment, the connection setting processing a cancel instruction for which is not accepted is processing which is performed at the initial setting time of the printer 101, the present exemplary embodiment is not limited to this. For example, the connection setting processing a cancel instruction for which is not accepted can be performed when the wireless LAN setting of the printer 101 is currently disabled or can be performed when initialization processing of the printer 101 has been performed. Moreover, for example, the connection setting processing a cancel instruction for which is not accepted can be performed regardless of whether the printer 101 is in the initial setting state when the printer 101 is powered on.

Various embodiments of the present disclosure can be implemented by processing for supplying a program for implementing one or more functions of the above-described exemplary embodiment to a system or apparatus via a network or a storage medium and causing one or more processors of a computer of the system or apparatus to read out and execute the program. Moreover, various embodiments of the present disclosure can also be implemented by using a circuit which implements such one or more functions (for example, an application specific integrated circuit (ASIC)).

The above-described exemplary embodiment can also be implemented by performing the following processing. Specifically, the processing supplies software (program) for implementing one or more functions of the above-described exemplary embodiment to a system or apparatus via a network or any type of storage medium and causes a computer (for example, a CPU or a micro processing unit (MPU)) of the system or apparatus to read out and execute the program. Moreover, the program can be executed by one computer or can be executed by a plurality of computers operating in conjunction with each other. Moreover, not all of the above-described processing operations need to be implemented by software, and a part or the whole of the processing operations can be implemented by hardware such as an ASIC. Moreover, with regard to a CPU, one CPU does not need to perform all of the processing operations, but a plurality of CPUs can perform the operations while cooperating with each other as appropriate.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-035176 filed Mar. 2, 2020, which is hereby incorporated by reference herein in its entirety.

What is claimed is:

1. A communication apparatus comprising:
at least one processor, wherein the at least one processor controls:
a first control unit configured to, in a case where an initial setting of the communication apparatus is not yet completed and, in a state in which the communication apparatus is powered off, and a power-on operation for powering on the communication apparatus has been performed, cause the communication apparatus to start operating in a connection setting state for performing, with a terminal apparatus, communication of connection information used for establishing a connection between the communication apparatus and a different apparatus that is different from the communication apparatus;
a second control unit configured to, in a case where the communication apparatus has performed communication of the connection information with the terminal apparatus which is currently connecting to the communication apparatus operating in the connection setting state, establish a connection between the communication apparatus and the different apparatus;
a third control unit configured to, in a case where an initial setting of the communication apparatus is not yet completed and, in a state in which the communication apparatus is powered off, and the power-on operation has been performed, start the initial setting; and
a fourth control unit configured to,
in a case where a connection between the communication apparatus operating in the connection setting state and the terminal apparatus has been established during a period in which the initial setting is being performed, display a predetermined notification screen on a display unit after the initial setting is completed, and,
in a case where a connection between the communication apparatus operating in the connection setting state and the terminal apparatus has not been established during a period in which the initial setting is being performed, not display the predetermined notification screen on the display unit after the initial setting is completed.

2. The communication apparatus according to claim 1, wherein, in a case where a connection between the communication apparatus operating in the connection setting state and the terminal apparatus has been established during a period in which the initial setting is being performed, and, by a communication of the connection information performed via a connection between the communication apparatus operating in the connection setting state and the terminal apparatus, a connection between the communication apparatus and the different apparatus has been established during a period in which the initial setting is being performed, the fourth control unit displays the predetermined notification screen on the display unit after the initial setting is completed, and wherein, in a case where a connection between the communication apparatus operating in the connection setting state and the terminal apparatus has been established during a period in which the initial setting is being performed, and, by a communication of the connection information performed via a connection between the communication apparatus operating in the connection setting state and the terminal apparatus, a connection between the communication apparatus and the different apparatus has not been established during a period in which the initial setting is being performed, the fourth control unit does not display the predetermined notification screen on the display unit after the initial setting is completed.

3. The communication apparatus according to claim 1, wherein the different apparatus is an access point located outside the communication apparatus and outside the terminal apparatus.

4. The communication apparatus according to claim 1, wherein the different apparatus is the terminal apparatus.

5. The communication apparatus according to claim 1, wherein the connection between the communication apparatus operating in the connection setting state and the terminal apparatus is a wireless connection compliant with a wireless communication standard.

6. The communication apparatus according to claim 5, wherein the wireless communication standard is at least one of Wi-Fi® or Bluetooth®.

7. The communication apparatus according to claim 1, further comprising a sixth control unit configured to, in a case where a connection between the communication apparatus operating in the connection setting state and the terminal apparatus has not been established during a period in which the initial setting is being performed, display, on the display unit, a specific notification screen which is a screen for prompting execution of processing for establishing a connection between the communication apparatus and the different apparatus and which is a screen different from the predetermined notification screen.

8. The communication apparatus according to claim 1, wherein the at least one processor further controls a fifth control unit configured to, in a case where an initial setting of the communication apparatus is completed and, in a state in which the communication is powered on, and a predetermined operation is performed on the communication apparatus, cause the communication apparatus to start operating in the connection setting state, wherein, even in a case where a connection between the communication apparatus, which is operating in the connection setting state that is started when the predetermined operation has been performed, and the terminal apparatus is performed, the fourth control unit does not display the predetermined notification.

9. The communication apparatus according to claim 1, wherein, even in a case where, by a communication of the connection information performed via a connection between the communication apparatus and the terminal apparatus compliant with a wired communication standard, a connection between the communication apparatus and the different apparatus has been established during a period in which the initial setting is being performed, the fourth control unit does not display the predetermined notification screen on the display unit after the initial setting is completed.

10. The communication apparatus according to claim 1, wherein the predetermined notification screen is a screen for issuing a notification indicating that a connection between the communication apparatus and the terminal apparatus has been established during a period in which the initial setting is being performed.

11. The communication apparatus according to claim 1, wherein the predetermined notification screen is a screen for issuing a notification indicating that, by a communication of the connection information performed via a connection between the communication apparatus and the terminal apparatus, a connection between the communication apparatus and the different apparatus has been established during a period in which the initial setting is being performed.

12. The communication apparatus according to claim 1, wherein, after the initial setting is completed, the communication apparatus also maintains operating in the connection setting state.

13. The communication apparatus according to claim 1, wherein, in a case where the initial setting is completed and an operation for powering on the communication apparatus has been performed, the communication apparatus does not start operating in the connection setting state.

14. The communication apparatus according to claim 1, wherein the initial setting includes processing for cleaning a constituent element included in the communication apparatus.

15. The communication apparatus according to claim 1, wherein a screen indicating that the communication apparatus has started operating in the connection setting state is not displayed on the display unit.

16. The communication apparatus according to claim 1,
wherein, in a case where a communication of the setting information has been performed, a connection between the different apparatus and the communication apparatus is established according to a first communication standard, and
wherein, in a case where a connection between the different apparatus and the communication apparatus has already been established according to a second communication standard different from the first communication standard, the communication apparatus does not start operating in the connection setting state.

17. The communication apparatus according to claim 1, wherein the connection setting state is a state in which the communication apparatus and the terminal apparatus connect to each other by peer-to-peer connection.

18. The communication apparatus according to claim 1, wherein the connection setting state is a state in which a predetermined access point located inside the communication apparatus is enabled.

19. The communication apparatus according to claim 1, wherein the communication apparatus stops operating in the connection setting state based on a predetermined time having elapsed from when the communication apparatus has started operating in the connection setting state.

20. The communication apparatus according to claim 1, further comprising a printing unit configured to print an image on a recording medium.

\* \* \* \* \*